United States Patent [19]
Yamaguchi et al.

[11] Patent Number: 5,982,806
[45] Date of Patent: Nov. 9, 1999

[54] LASER BEAM CONVERTER FOR CONVERTING A LASER BEAM WITH A SINGLE HIGH-ORDER TRANSVERSE MODE INTO A LASER BEAM WITH A DESIRED INTENSITY DISTRIBUTION AND LASER RESONATOR FOR PRODUCING A LASER BEAM WITH A SINGLE HIGH-ORDER TRANSVERSE MODE

[75] Inventors: Satoshi Yamaguchi; Katsuhiro Minamida, both of Chiba, Japan

[73] Assignee: Nippon Steel Corporation, Tokyo, Japan

[21] Appl. No.: 08/854,096

[22] Filed: May 9, 1997

[30]     Foreign Application Priority Data

May 10, 1996  [JP]  Japan ..................................... 8-140746
May 10, 1996  [JP]  Japan ..................................... 8-140747

[51] Int. Cl.$^6$ ....................................................... H01S 3/10
[52] U.S. Cl. ............................ 372/103; 372/19; 372/102
[58] Field of Search ............................... 372/98, 99, 102, 372/103, 19

[56]              References Cited
              U.S. PATENT DOCUMENTS 4,895,790   1/1990  Swanson et al. ......................... 430/321
5,065,407  11/1991  Pax ........................................... 372/103
5,745,511   4/1998  Leger ......................................... 372/19

Primary Examiner—James W. Davie
Attorney, Agent, or Firm—Pollock, Vande Sande & Amernick

[57]                  ABSTRACT

In order to obtain a high-power laser beam with a high beam quality with use of a small-sized and low-cost apparatus, there has been disclosed a laser resonator which is constructed so as to produce a single high-order transverse mode laser beam, and a technique for converting the laser beam with a single high-order transverse mode into a laser beam with a high beam quality. The laser resonator is provided with a regulating plate of a high-order transverse mode which is constructed so as to produce a laser beam in a single high-order transverse mode. A phase adjusting plate inverts a phase for each region of the laser beam divided depending upon a lateral mode thereof to match the phase for each region of the laser beam, and subsequently, a traveling direction of the laser beam is changed for each position thereof by means of the first binary optics element, and further, the laser beam is converted into a parallel beam by means of the second binary optical element. The first binary optics element changes the traveling direction of the ray of the laser beam for each region thereof so that the laser beam has a desired intensity distribution on the second binary optics element.

15 Claims, 26 Drawing Sheets

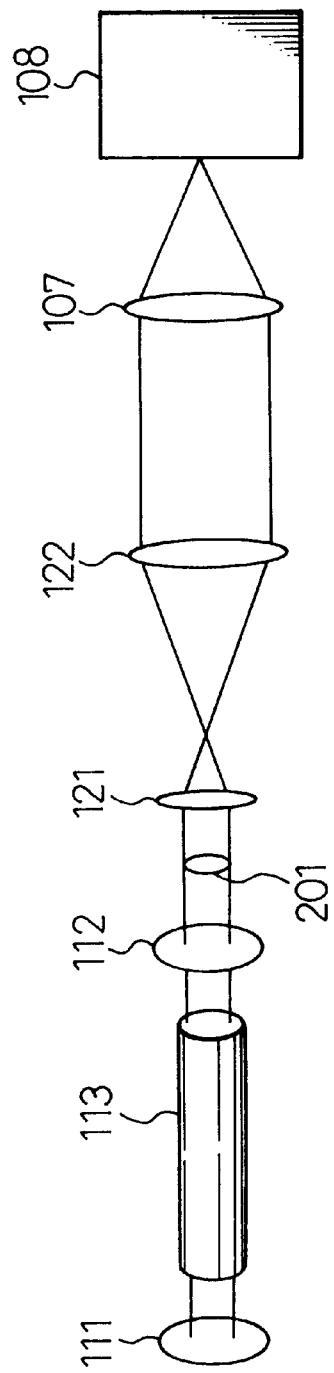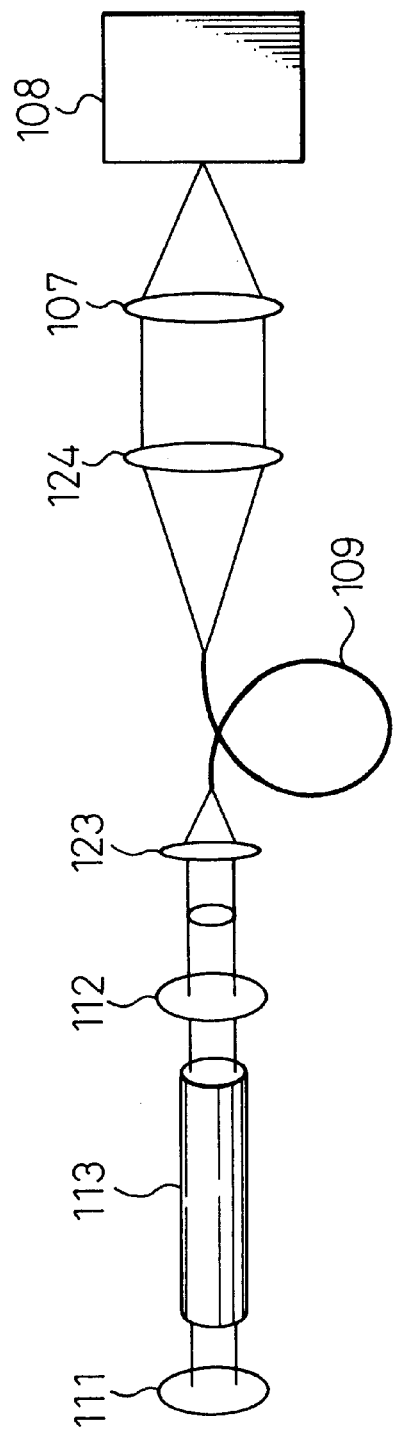

Fig. 2A
TEM$_{00}$
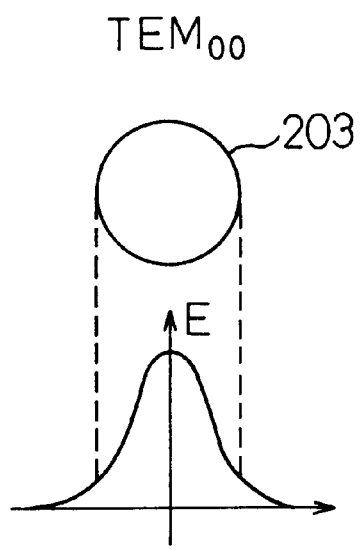
Fig. 2B
TEM$_{10}$
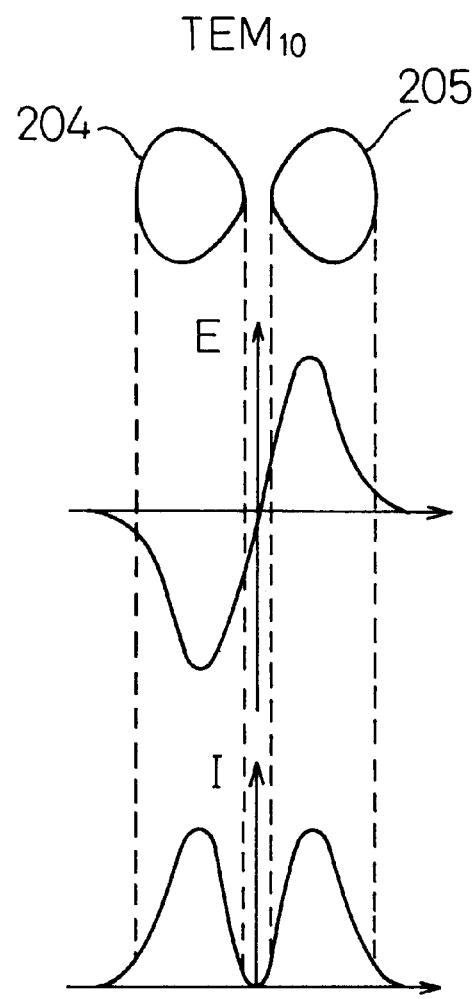
Fig. 2C
TEM$_{11}$
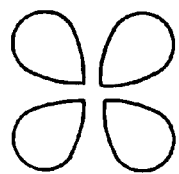
Fig. 2D
TEM$_{32}$
○○○○
○○○○
○○○○

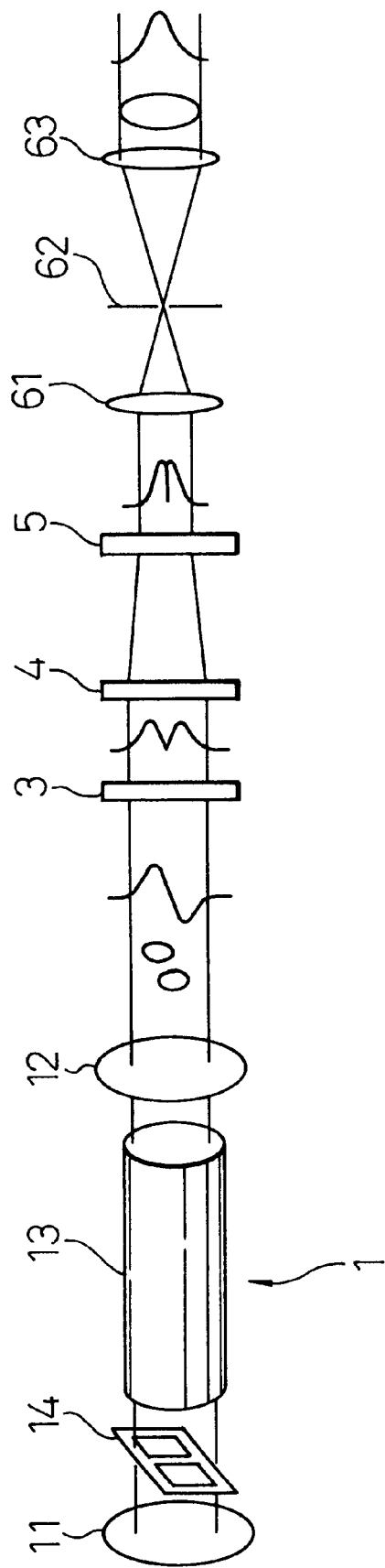

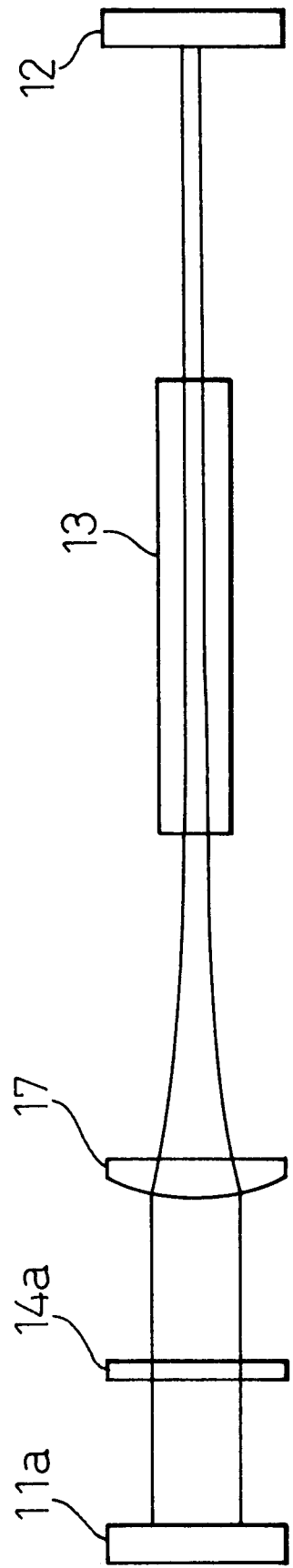

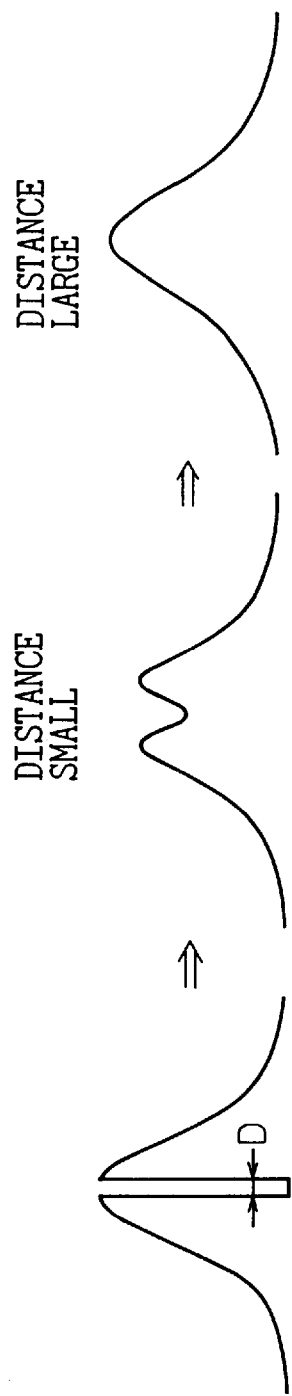
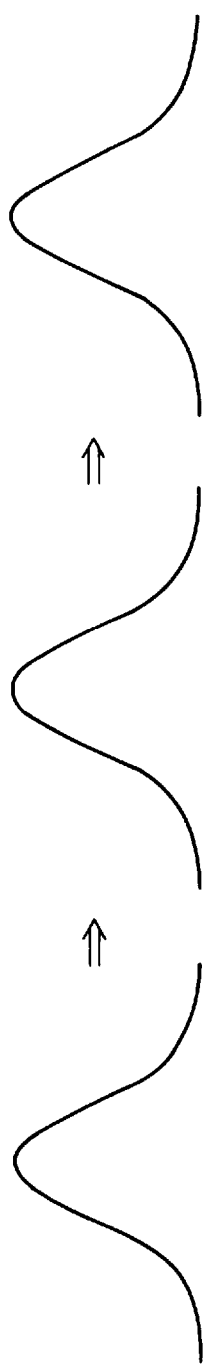
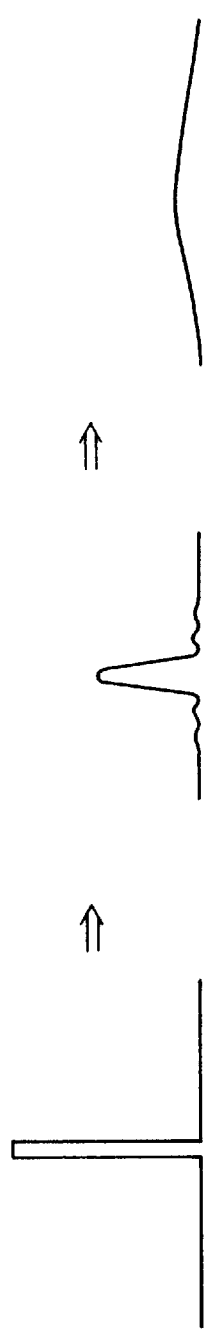
Fig.14A
Fig.14B
Fig.14C

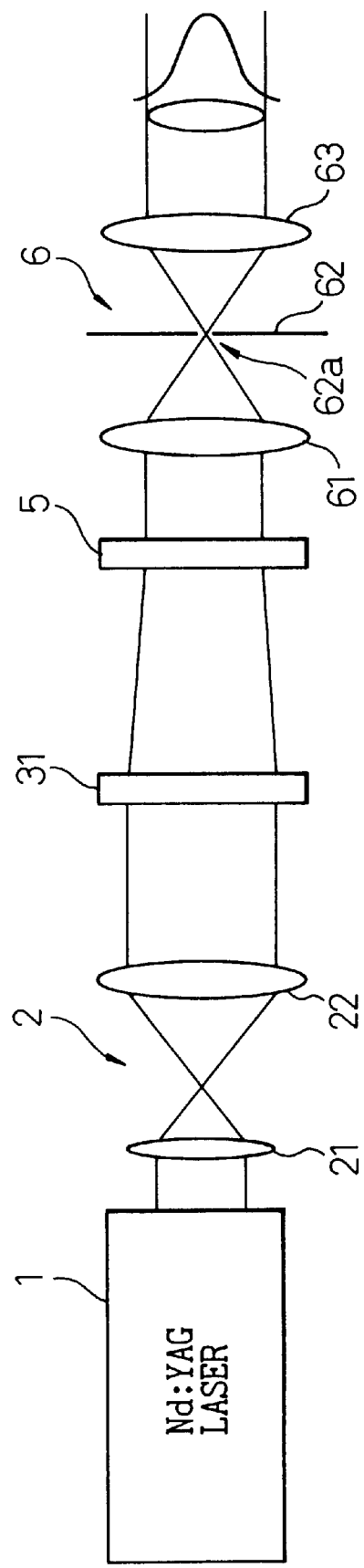

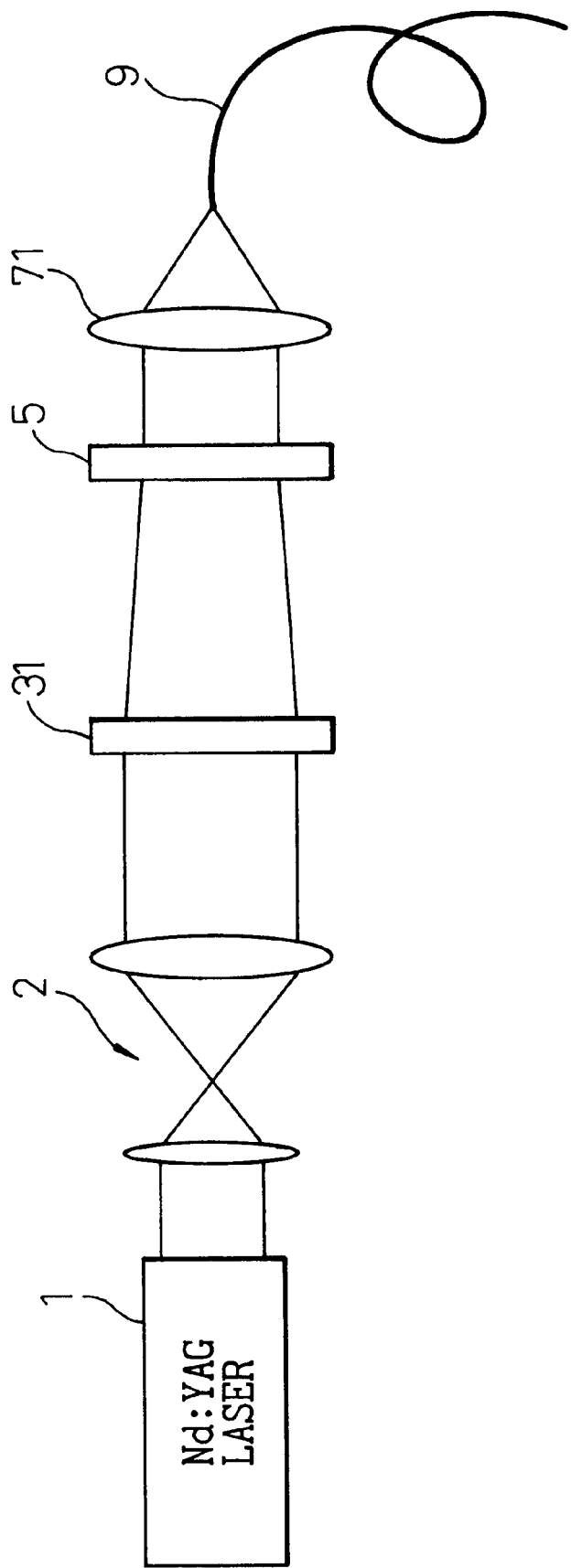

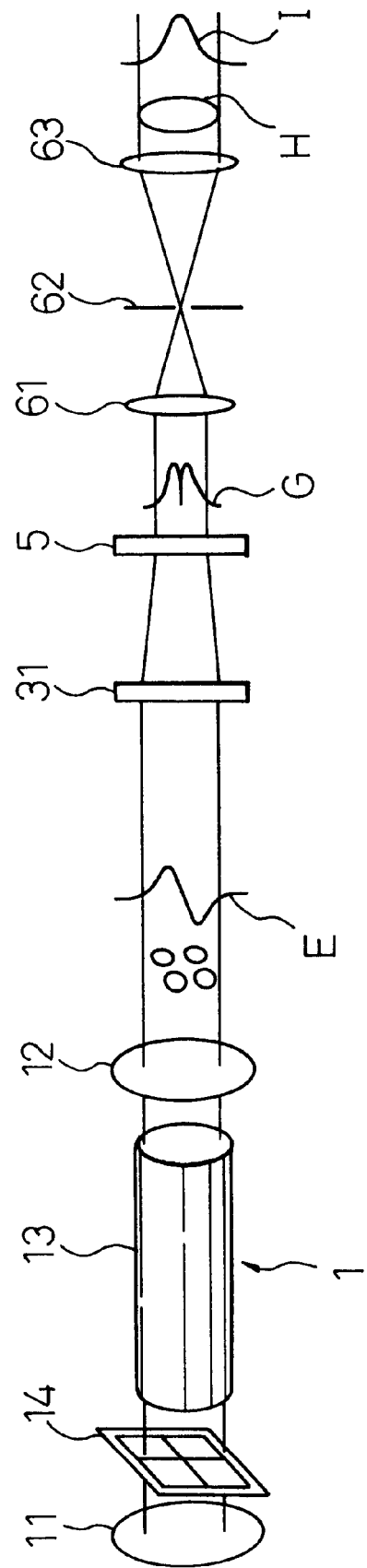

LASER BEAM CONVERTER FOR CONVERTING A LASER BEAM WITH A SINGLE HIGH-ORDER TRANSVERSE MODE INTO A LASER BEAM WITH A DESIRED INTENSITY DISTRIBUTION AND LASER RESONATOR FOR PRODUCING A LASER BEAM WITH A SINGLE HIGH-ORDER TRANSVERSE MODE

BACKGROUND OF THE INVENTION

1. Field of the Invention

The present invention relates to a laser resonator and a laser beam converter for generating a laser beam with high power and high beam quality used for a laser processing machine, etc. In particular, the present invention relates to a laser resonator which emits a high-power laser beam by being constructed so that a laser beam with a single high-order transverse mode is emitted, and to a technique for converting a laser beam with a high-order transverse mode into a laser beam with high beam quality.

2. Description of the Related Art

In recent years, processing with a laser beam, that is, laser materials processing, has been utilized. Laser materials processing is carried out by converging a laser beam with an optical element and irradiating the converged laser beam to a portion to be processed. An optical lens and a mirror are mainly used as the aforesaid optical element for convergence. A diffractive optical element which is constructed so as to exhibit a lens effect by forming a diffraction grating on the surface of a glass substrate may be used as the optical element. A binary optics element, which is a kind of diffractive optical element, can be used for a high power laser beam. Also, there has been utilized laser materials processing carried out such that a laser beam emitted from a laser resonator is converged onto an end face of a core portion of an optical fiber without directly converging the laser beam on a portion to be processed, and is guided into an optical fiber, and subsequently, a laser beam emitted from an end facet of the optical fiber is converged on the portion to be processed.

In most cases of the laser materials processing, a converged laser beam is desired to have a single spot intensity distribution. For some materials processings, if the converged laser beam is divided into plural spots, the laser beam is irradiated onto portions other than portions to be processed. This causes disadvantages that a desired processing can not be achieved, and that the energy of laser beam is dispersed. For this reason, the laser beam energy is not irradiated onto the portion to be processed with high density; causing a problem that processing efficiency is poor. Also, if the laser beam is divided into plural spots when it is guided into the optical fiber, there exists a spot which is not guided to the core portion of the optical fiber, causing a problem that the energy of laser beam is not effectively used. Moreover, the laser beam is converged with use of a spherical lens and the binary optics element which is constructed so as to exhibit the same lens effect as the spherical lens by forming the diffraction grating into a concentric circle shape. In such a case, since the intensity distribution of the converged laser beam is the same as that of the laser beam incident upon the spherical lens and the binary optics element, a laser resonator which produces a laser beam having a single spot intensity distribution is desired as a light source.

A gas laser such as a $CO_2$ laser or a solid-state laser such as Nd:YAG laser is used as a light source for laser materials processing. As is well known, in the gas or solid-state laser, since there is a transverse mode, laser oscillation takes place in various transverse modes, and the transverse mode in which oscillation takes place varies depending upon environmental conditions. For instance, in a $TEM_{00}$ mode, a laser beam has a Gaussian distribution in its electric field amplitude, and also, has a Gaussian distribution in its intensity, namely, the laser beam is formed into a single spot. On the contrary, in a high-order transverse mode than the $TEM_{00}$, the laser beam is divided into plural spots. In other words, the laser beam with a high-order transverse mode has a beam quality worse than the $TEM_{00}$-mode laser beam.

In the case where an output power of the laser resonator is low, the laser resonator can stably oscillate a laser beam in the $TEM_{00}$ mode. However, if the output power of the laser resonator is made high, oscillation takes place in a high-order transverse mode than the $TEM_{00}$. Thus, it is desirable that a light source for laser processing has as high output power as possible. In particular, taking workability, cost or efficiency into consideration, it is desirable that as high power as possible can be obtained with the identical laser resonator. But, as seen from the above description, if the output of the laser resonator is made high, the laser beam becomes a high-order transverse mode than the $TEM_{00}$; for this reason, there has arisen a problem that the output power from the laser resonator can not be made high as desired while maintaining the beam quality of the output to be high. Thus, there has been desired development of a technique capable of providing a high-power laser beam having high beam quality.

SUMMARY OF THE INVENTION

An object of the present invention is to provide a high-power laser beam of high beam quality with use of a small-sized and low-cost apparatus.

In order to achieve the above object, the present invention provides a laser resonator which stably emits a laser beam with a single high-order transverse mode, and a laser beam converter which converts a laser beam with a high-order transverse mode into a laser beam with high beam quality.

According to the present invention, there is provided a laser beam converter for converting a laser beam with a single high-order transverse mode into a laser beam having a predetermined distribution, comprising: phase adjusting means for inverting a phase for each region of the laser beam divided depending upon a transverse mode thereof so as to match the phase of each region of the laser beam; first direction change means for changing a traveling direction of a ray of the laser beam with the phase matched by the phase adjusting means, for each position of the ray; and second direction change means for changing the traveling direction of a ray of the laser beam exiting from the first direction change means for each position of the laser beam so as to form a parallel laser beam, the first direction change means changing a direction of the laser beam for each position thereof so that the laser beam becomes a beam with a predetermined intensity distribution at the second direction change means.

The laser beam with a high-order transverse mode has a $\pi$ phase shift for each region divided depending upon the transverse mode; for this reason, even if the laser beam is converged in a state of being unchanged, a single laser beam cannot be obtained. To avoid such a disadvantage, at first, the phase adjusting means matches a phase for each region of the laser beam so that laser beams of adjacent regions are interactive. In such a state, the laser beam still has plural spots corresponding to the high-order transverse mode, and is in a state that the intensity between respective spots is low and there is a large channel in its intensity distribution. In order to avoid such a disadvantage, the first direction change means changes the traveling direction of a ray of the laser beam so that a predetermined intensity distribution can be obtained at the second direction change means, and then, the laser beam is converted into a parallel beam by means of the second direction change means. In this way the channel width in the intensity distribution becomes extremely narrow. If the channel width becomes narrow as described above, since the phase for each region of the laser beam is matched, the laser beams of adjacent regions are interactive by diffraction during the travel of the laser beam. Therefore, the channel in the intensity distribution can be disregarded. Also, even if the phase adjusting means merely matches the phase of each region, the channel width in the intensity distribution becomes narrow to some degree in the case where the traveling distance of the laser beam is sufficiently long.

With the above construction, however, the laser beam is converted into a fully parallel beam, and still contains non-parallel components to some degree. Such a non-parallel component is once converged by the first optical element, and is passed through a pinhole with a predetermined shape arranged on the laser beam converged position, thereby being removed. Then, the laser beam passed through the pinhole is converted into a parallel beam with use of the second optical element, so that a laser beam which does not contain non-parallel components can be obtained. Moreover, if a core end face of an optical fiber is arranged on the laser beam converged position in place of the pinhole, most of laser beam can be guided into the core of the optical fiber.

The phase adjusting means and the first direction change means are integrated together, and may be formed as a phase-adjusting/direction-change element.

For example, a binary optics element, which is made by etching a portion on a transparent glass plate subjected to masking and causes an arbitrary phase differences in each portion of a laser beam, functions as the phase adjusting means and the first and second direction change means. The phase adjusting means has a difference in its thickness such that a phase difference with a half wavelength of laser beam is caused for each region corresponding to a high-order transverse mode of the laser beam. On the other hand, the first and the second direction change means comprise diffraction gratings which correspond to change in the traveling direction for each region of the laser beam and a change in the traveling direction thereof.

Moreover, the phase adjusting means and the first and the second direction change means are made on the assumption that the output laser beam is a laser beam with a predetermined high-order transverse mode. Thus, a laser resonator is required to emit a laser beam with a predetermined single high-order transverse mode laser beam. According to the present invention, there is provided a laser resonator which emits a laser beam with a single high-order transverse mode, comprising: a laser medium; a rear mirror and an output mirror arranged on opposite sides of the laser medium; and high-order transverse mode regulating means which is arranged between the rear mirror and the output mirror, and regulates the laser beam so that oscillation takes place in a predetermined high-order transverse mode.

The regulating means of high-order transverse mode shields and diffuses laser beams with other transverse modes, whereby a construction is made such that the laser resonator does not function as a resonator in other transverse modes. Further, the regulating means of high-order transverse mode comprises a transparent plate with a channel formed in a boundary of regions divided depending upon the single high-order transverse mode, or comprises a light shielding plate with a window for passing only laser beam of regions divided depending upon the single high-order transverse mode.

As described above, the regulating means of high-order transverse mode has a shape corresponding to a profile of the laser beam of the laser resonator. If it is difficult to construct the regulating means of high-order transverse mode because the laser beam of the laser resonator is too small or too large, the beam radius change means for changing a laser beam radius may be arranged between the rear mirror and the output mirror, and the regulating means of high-order transverse mode may be located on an optical path of the laser beam whose beam radius is changed.

BRIEF DESCRIPTION OF THE DRAWINGS

The present invention will be more clearly understood from the description as set forth below with reference to the accompanying drawings, wherein:

FIG. 1A and FIG. 1B are views showing a basis construction of a prior art optical system in laser processing;

FIG. 1A showing a construction in which a laser beam emitted from a laser resonator directly irradiates to a workpiece; on the other hand, FIG. 1B showing a construction in which the laser beam emitted from the laser resonator is guide to the vicinity of a workpiece via an optical fiber, and thereafter, irradiates to the workpiece;

FIG. 2A to FIG. 2D are views showing the difference between laser beam depending upon transverse modes;

FIG. 2A showing a $TEM_{00}$-mode laser beam;

FIG. 2B showing a $TEM_{10}$-mode laser beam;

FIG. 2C showing a $TEM_{11}$-mode laser beam; and

FIG. 2D showing a $TEM_{32}$-mode laser beam;

FIG. 3 is a view showing a construction of a laser resonator and a laser beam converter according to the first embodiment of the present invention;

FIG. 7A showing a regulating plate of high-order transverse mode for a $TEM_{11}$ mode; on the other hand, FIG. 7B showing a regulating plate of high-order transverse mode for a $TEM_{32}$ mode;

FIG. 8 is a view showing a modification example in which beam-radius changing means is provided in the laser resonator;

FIG. 14A to FIG. 14C are views showing a change in an intensity distribution accompanying with a travel of a laser beam with a channel in the center of the intensity distribution;

FIG. 21 is a view showing a construction according to the second embodiment of the present invention;

FIG. 23 is a view showing a construction according to the third embodiment of the present invention;

FIG. 25 is a view showing a construction according to the fourth embodiment of the present invention.

DESCRIPTION OF THE PREFERRED EMBODIMENTS

Figure 4:
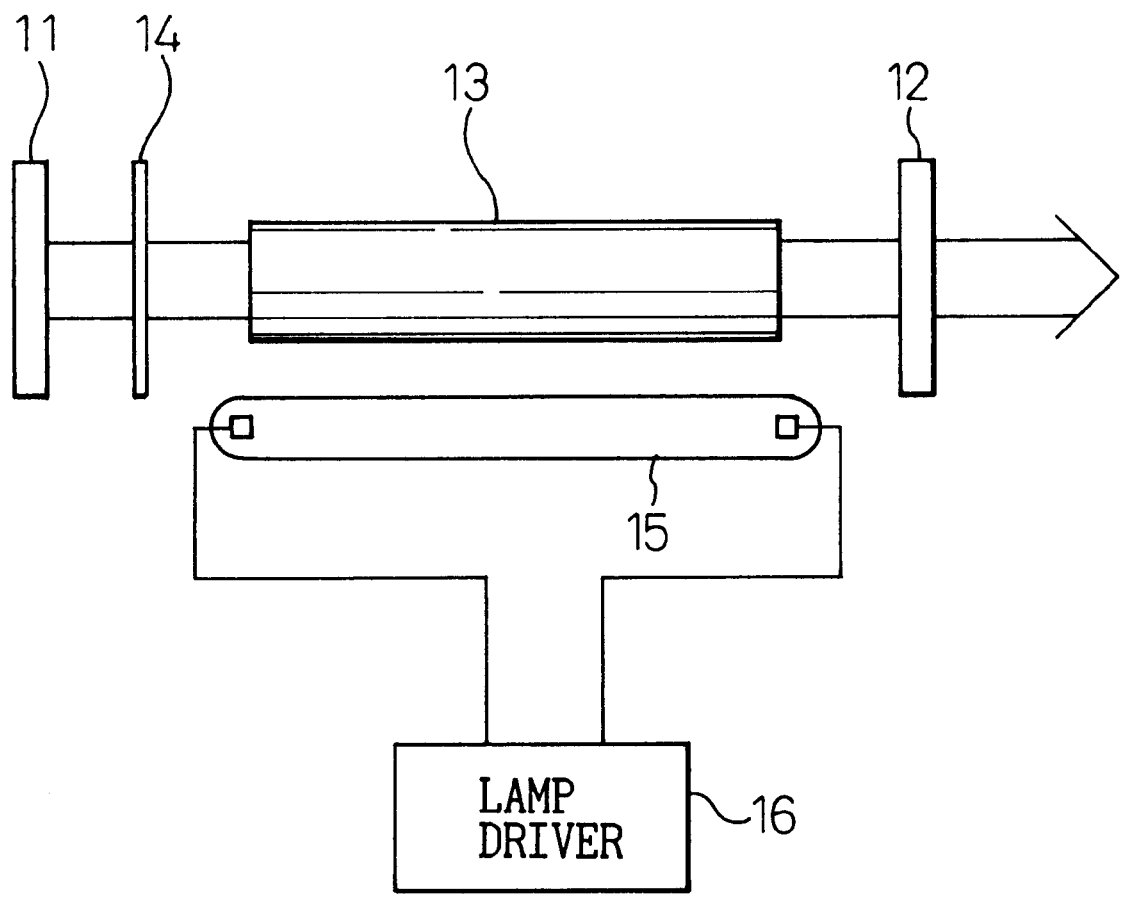
FIG. 4 is a view showing a construction of the laser resonator according to the first embodiment of the present invention.

Before proceeding to a detailed description of the preferred embodiments of the present invention, a prior art optical system for a laser processing machine will be described, with reference to the accompanying drawings relating thereto, for a clear understanding of the differences between the prior art and the present invention.

FIG. 1A is a view showing a basis construction of a prior art optical system for a laser processing machine. In FIG. 1, a rear mirror 111, an output mirror 112 and a laser medium 113 constitute a laser resonator. The laser medium 113 is a discharge tube if it is a gas laser such as an argon ion laser or a $CO_2$ laser, or is usually a cylindrical rod if it is a solid-state laser such as a Nd:YAG laser. If the laser medium is a rod, a light source for pumping the laser medium 113 is provided near the laser medium; however, it is omitted in the figure. It is desired that a laser beam emitted from the output mirror 112 is a $TEM_{00}$-mode laser beam, and has a Gaussian distribution in its intensity distribution, and that the laser beam has a circular beam profile as shown by a reference numeral 201. And then, the laser beam is converged and irradiated onto a processing portion of workpiece 108 by means of an irradiation optical element 107 after its beam radius is enlarged by means of a beam expander composed of optical elements 121 and 122. It is desired that the laser beam incident upon the irradiation optical element 107 has a Gaussian distribution in its intensity distribution, and that the laser beam has a small beam radius in a state of being irradiated onto a portion to be processed in the workpiece, and has a Gaussian distribution in its intensity distribution, and becomes a circular spot. The laser processing machine performs processing in a manner of irradiating a converged laser beam with high energy density onto a processing portion, and locally raising to high temperature in the processing portion. If the laser beam is divided into plural spots, it is irradiated onto portions other than the portion to be processed; for this reason, a desired processing can not be achieved. Moreover, since the laser beam energy is dispersed, it is impossible to irradiate a high energy laser beam onto the processing portion, causing a problem that processing efficiency becomes worse. Therefore, it is desired that a Gaussian beam having a single spot is used in the laser processing machine.

Spherical lenses may be used as the aforesaid optical elements 121, 122 and 107, and also, a diffractive optical element disclosed in U.S. Pat. No. 4,895,790 such as the above-mentioned binary optics element may be used. The binary optics element exhibits a lens effect by forming a diffraction grating on the surface of a glass substrate with use of semiconductor manufacturing technology. Since the diffraction grating is formed into an arbitrary two-dimensional shape, the binary optics element can not only exhibit a single lens or non-spherical lens effect, but also has a complicated effect of exhibiting partially different lens characteristics. Further, the diffraction grating is formed with an inclined plane having a continuously micro step structure. With the structure, the inclined plane of the diffraction grating is approximated to a desired inclined plane, so that a very high diffraction efficiency of more than 95% can be obtained.

FIG. 1B shows a construction in which the laser beam emitted from the laser resonator is once guided to an optical fiber 109, and then, a laser beam emitted from an output end of the optical fiber is converted into a parallel beam by means of an optical element 124, and thereafter, is irradiated onto the workpiece 107 with use of the irradiation optical element 107. More specifically, a core end face of the optical fiber 109 is arranged on a position where the laser beam is converged by the optical element 123 and becomes a small spot, and then, the laser beam is guided into a core portion of the optical fiber 109. The converged laser beam has a small diameter and a Gaussian distribution. Thus, if the converged laser beam diameter is kept so as to become the substantially same as the core diameter of the optical fiber 109, most of the laser beam energy can be guided into the core portion of fiber 109. Also, if the core diameter is made larger than the converged laser beam diameter, most of the laser beam energy can be guided into the core portion of fiber 109 even if the laser beam is not a Gaussian beam. In this case, a laser beam emitted from the other core end face of the optical fiber can be converged into a spot having the core diameter. Therefore, it is necessary that the core diameter of an optical fiber is as small as possible.

A gas laser such as a $CO_2$ laser or a solid-state laser such as a Nd:YAG laser is used as a light source for laser processing. In such a laser resonator, since there is a transverse mode, laser oscillation takes place in various transverse modes. The transverse mode where oscillation takes place is determined depending upon various conditions. If environmental conditions vary, a transverse mode where oscillation takes place changes. FIG. 2A to FIG. 2D are views for explaining a transverse mode laser beam; FIG. 2A showing a $TEM_{00}$-mode laser beam; FIG. 2B showing a $TEM_{10}$-mode laser beam; FIG. 2C showing a $TEM_{11}$-mode laser beam; and FIG. 2D showing a $TEM_{32}$-mode laser beam. As shown in FIG. 2A, in a $TEM_{00}$-mode, an electric amplitude distribution of laser beam becomes Gaussian distribution, and also, the intensity distribution of the laser beam has Gaussian distribution. Therefore, the laser beam has a circular beam shape as shown by a reference numeral 203. In the $TEM_{10}$ mode, as shown in FIG. 2B, the sign of the electric amplitude is reverse in the right and left regions, and gives plus and minus, respectively. On the other hand, since the intensity of laser beam is equivalent to a value of the square of the electric amplitude, the intensity distribution has a symmetry right and left. Therefore, the laser beam is divided into two spots as shown by reference numerals 204 and 205. As shown in FIG. 2C, in the $TEM_{11}$ mode, the laser beam is divided into four spots; on the other hand, as shown in FIG. 2D, in the $TEM_{32}$ mode, it is divided into twelve spots. As seen from the above description, the laser beams with high-order transverse modes than the $TEM_{00}$ are neither converged into a single spot, nor effectively guided into the optical fiber.

The laser resonator can stably produce a $TEM_{00}$-mode laser beam if its output power is low. However, if the output power of the laser resonator is made high, oscillation takes place in a higher-order transverse mode than the $TEM_{00}$. It is desirable that high output is obtained as a light source for laser materials processing. However, if the output power from the laser resonator is made too high, the laser beam becomes to have a high-order transverse mode than the $TEM_{00}$. For example, the output power of a Nd:YAG laser is at most about ten and several watts in the $TEM_{00}$ mode. If the output power is made higher, the oscillation takes place in a high-order transverse mode. If the oscillation takes place in the $TEM_{11}$ mode, the laser power can be several hundreds watts, and is more than several tens times as much as the $TEM_{00}$ mode. Taking the aforesaid disadvantages into consideration, according to the present invention, there can be provided a construction in which the laser resonator oscillates in a predetermined high-order transverse mode so that a high power laser beam can be obtained, and the laser beam with a high-order transverse mode is converted into a laser beam with high beam quality. Embodiments of the present invention will be described below. The embodiments show an example of converting the laser beam with a high-order transverse mode into a laser beam with an intensity distribution of substantially Gaussian distribution. However, the present invention is not limited to the above intensity distribution. The laser beam with a high-order transverse mode may be converted into, e.g., a laser beam with an intensity distribution of a substantially rectangular distribution.

FIG. 3 is a view showing the whole construction of a laser resonator and a laser beam converter according to a first embodiment of the present invention. If the resonator is used as a light source for a laser processing machine, a laser beam emitted from the resonator is supplied to irradiation optical elements shown in FIG. 1A. However, the present invention is not limited to the laser processing machine, and is applicable as a light source of an apparatus using other laser beams.

First, the whole construction will be explained, and thereafter, its details will be described. A rear mirror 11, an output mirror 12 and a laser medium 13 constitute a laser resonator. The optical path is provided with a transverse mode regulating plate 14 for regulating a transverse mode in which laser resonator 1 oscillates so as to become a predetermined high-order transverse mode. Thus, the laser resonator stably emits a laser beam with a predetermined high-order transverse mode. In this embodiment, a $TEM_{10}$ mode laser beam is emitted. In the $TEM_{10}$ mode, the sign of the electric amplitude is reverse in right and left regions, and gives positive and negative, respectively, as shown in the figure. Namely, the laser beam has a $\pi$ phase shift in the right and left regions.

A phase adjusting plate 3 inverts a phase for each region of the high-order transverse mode laser beam divided depending upon the transverse mode in accordance with a mode number so that the phase of each region of the laser beam can be matched. The electric amplitude distribution of laser beam is adjusted as shown in the figure by means of the phase adjusting plate 3, and then, laser beams of adjacent regions are interactive. However, in the aforesaid state, a channel exists in the middle of the electric field amplitude, and the middle portion of intensity distribution is considerably reduced; for this reason, the laser beam is divided into two spots. To avoid such a disadvantage, the traveling direction of laser beam is changed for each portion thereof by means of a first direction change binary optics element 4, and further, as shown in the figure, the channel in the center portion of electric filed amplitude is made narrow by means of a second direction change binary optics element 5. Hereinafter, the aforesaid first and second direction change binary optics elements are referred simply to as the first and the second binary optics elements, respectively. The second binary optics element 5 changes a direction of laser beam incident upon each portion of the binary optics element so that the direction of the incident laser beam becomes parallel with an optical axis. Therefore, a laser beam existing from the second binary optics element 5 becomes a laser beam which has an electric amplitude distribution as shown in the figure and parallel with the optical axis. If the channel in the middle of the laser beam is very narrow, the channel soon becomes shallow in its depth with the relation of diffraction, and then, may be almost disregarded. Thus, a laser beam with a desired intensity distribution can be obtained. The laser beam in such a state is still not a fully parallel beam, and contains non-parallel components which is attributed to the channel of the electric amplitude in the middle. For this reason, in order to remove the non-parallel component of laser beam, the laser beam is once converged by means of a first lens 61, and then, is passed through an aperture member 62 which is located on the laser beam converged position and is formed with a pinhole 62a having a predetermined shape. Further, the laser beam is formed into a parallel beam by means of a second lens 63. The laser beam thus formed has intensity distribution of substantially Gaussian distribution as shown in FIG. 2B.

FIG. 4 is a view showing a construction of the laser resonator 1 according to this embodiment. The laser resonator 1 is a Nd:YAG laser, and the laser medium 13 is a Nd-YAG cylindrical rod. There are provided an excitation lamp 15 for pumping the rod and a lamp driver 16 for driving the excitation lamp 15. Further, there are reflecting mirrors (not shown) for effectively irradiating a light of the excitation lamp 15 onto the rod 13. One side of the rod 13 is provided with a rear mirror 11; the other side thereof is provided with an output mirror 12. In the manner as described above, a laser resonator is constructed. Also, the aforesaid construction is the same as the resonator in the prior art. In this embodiment, a Nd:YAG laser is recited as an example of the resonator; however, other laser resonators may be used. For example, if a solid-state laser other than Nd:YAG laser is used, the laser resonator has the same construction, or if a gas laser such as $CO_2$ laser is used, the laser medium 13 is a discharge tube. In general, since the solid-state laser has a beam quality worse than the gas laser, the present invention is more effective when being applied to solid-state laser.

In this embodiment, the transverse mode regulating plate 14 is provided in an optical path between the rear mirror 11 and the laser medium (rod) 13, in addition to the prior art construction. The transverse mode regulating plate 14 may be located everywhere if it is situated between the rear mirror 11 and the output mirror 12. In a laser resonator which emits a laser beam of several millimeters beam waist, it is considered that the same electric field amplitude appears in the optical path between the rear mirror 11 and the output mirror 12. Therefore, if oscillation takes place in the $TEM_{00}$ mode, the laser beam has the electric amplitude distribution as shown in FIG. 2A; on the other hand, if oscillation takes place in the $TEM_{10}$ mode, the laser beam has the electric amplitude distribution as shown in FIG. 2B. In the laser resonator, if oscillation take place in a certain transverse mode, oscillation is suppressed from taking place in transverse modes other than that. Therefore, in order to cause the oscillation to take place in a single transverse mode, a construction may be made so that a resonance path is formed in only single transverse mode without being formed in other transverse modes.

Figure 5A:
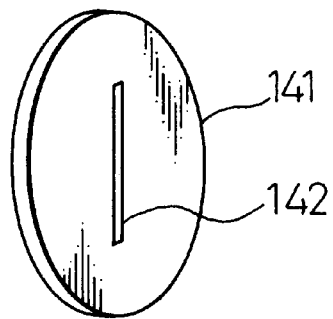
FIG. 5A to FIG. 5C are views showing a regulating plate of high-order transverse mode according to the first embodiment of the present invention.
Figure 5B:
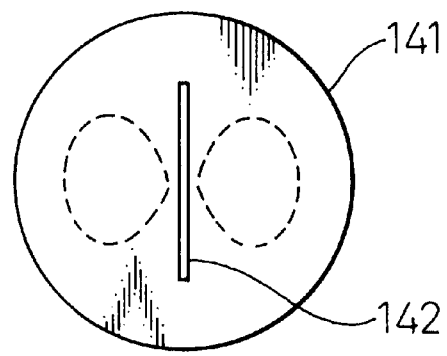
Figure 5C:
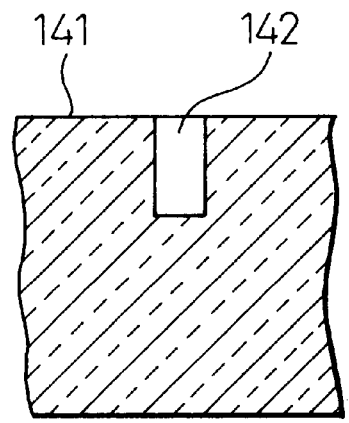

FIG. 5A to FIG. 5C are views showing the transverse mode regulating plate 14. The transverse mode regulating plate 14 comprises a transparent glass substrate 141 which is formed with a longitudinal slit 142. As shown in FIG. 5B, the slit is formed so that it extends longitudinally between two beam spots of $TEM_{10}$ mode, that is, the center of them. Since a laser beam passing through the slit has different phase and is a fine beam, the laser beam is diverged resulting from diffraction; therefore, the resonance path passing through the slit is not formed. Thus, in the $TEM_{00}$ and $TEM_{01}$ modes having spots passing through the slit, neither a resonance path is formed, nor oscillation takes place in the above two modes. Although transverse modes which do not pass through the slit are $TEM_{10}$ and $TEM_{11}$ modes, it is possible to stably cause oscillation to take place in only $TEM_{10}$ mode by setting other oscillation conditions.

Figure 6A:
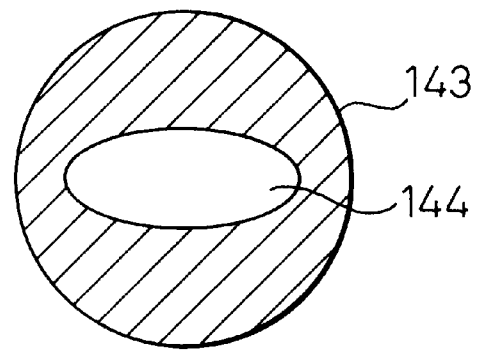
FIG. 6A to FIG. 6C are views showing another regulating plate of high-order transverse mode according to the first embodiment of the present invention.
Figure 6B:
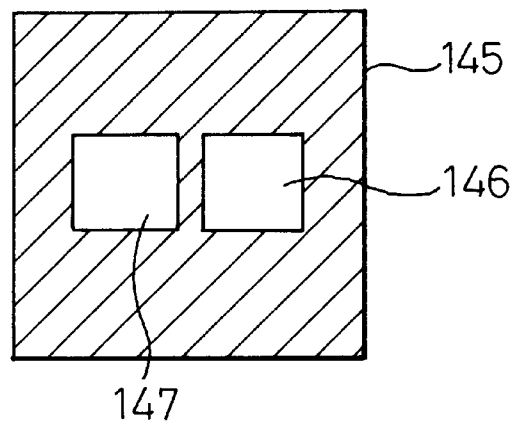
Figure 6C:
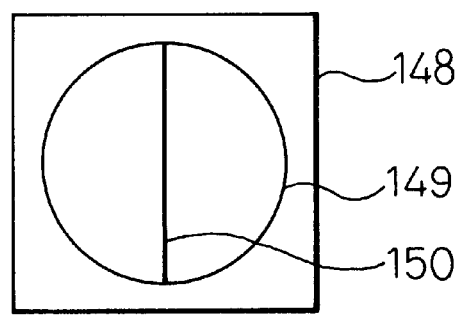

FIG. 6A to FIG. 6C are views showing other examples of the transverse mode regulating plate 14 for realizing the $TEM_{10}$ mode. FIG. 6A shows a light shielding plate 143 having an elliptic aperture 144. The light shielding plate is realized by forming an opening equivalent to the aperture 144 in a metal plate, or by processing the surface of transparent glass substrate so that portions other than the aperture 144 are irregularly reflected. FIG. 6B shows a light shielding plate 145 which has two square or rectangular apertures 146 and 147, and is manufactured in the same manner as above. FIG. 6C shows a transverse mode regulating plate 148. The transverse mode regulating plate 148 has a circular aperture 149 which is provided with a fine light shielding member 150 at the center portion of the aperture. If the transverse mode regulating plate 148 is made of a metal plate, the light shielding member 150 may be made of a wire.

Figure 7A:
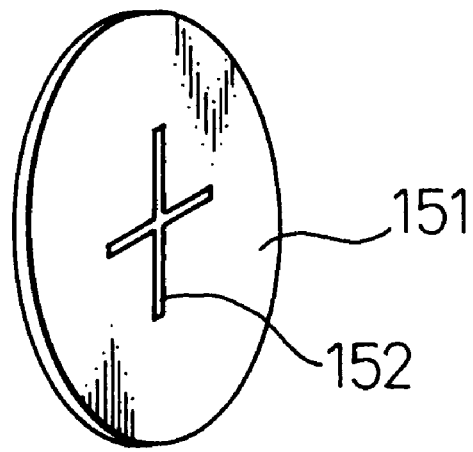
FIG. 7A and FIG. 7B are views showing a regulating plate of high-order transverse mode for another high-order transverse mode.
Figure 7B:
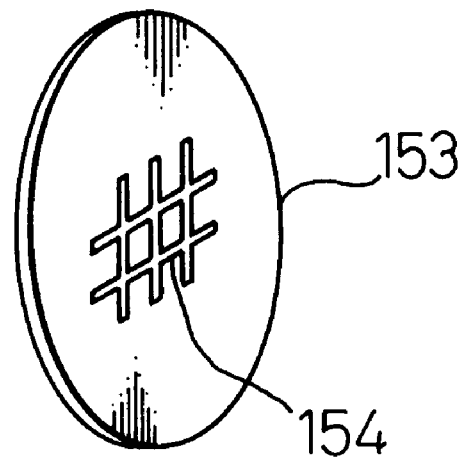

FIG. 7A and FIG. 7B are views showing other examples of the transverse mode regulating plate for causing oscillation to take place in $TEM_{11}$ and $TEM_{32}$ modes. These transverse mode regulating plates are manufactured in the same manner as transverse mode regulating plates shown in FIG. 5A to FIG. 5C. As shown in FIG. 7A, in the $TEM_{11}$ mode, a glass substrate 151 is formed with a cross-shape slit 152. As shown in FIG. 7B, in the $TEM_{32}$ mode, a glass substrate 153 is formed with a grating slit 154.

As described above, the transverse mode regulating plate has shapes corresponding to various laser beam profiles of the laser resonator. However, if the laser beam of the laser resonator is too small or too large in a profile, there is a case where it is difficult to manufacture a transverse mode regulating plate corresponding to the profile. For example, in if the beam diameter is very small, it is difficult to form many slits as shown in FIG. 7B so that they correspond to the very small beam diameter. In such a case, as shown in FIG. 8, a spherical lens 17 is arranged in the optical path of the laser resonator to enlarge a beam diameter of part of the optical path, and then, a transverse mode regulating plate 14a is located on the position with the enlarged beam diameter on the optical path. By doing this, the shape of the slit is enlarged in accordance with an enlargement ratio of the beam diameter, so that the slit can be easily formed. In FIG. 8, there is shown an arrangement such that a focal position of one spherical lens 17 becomes a beam waist position. A beam expander composed of two spherical lenses may be used therein.

Figure 9:
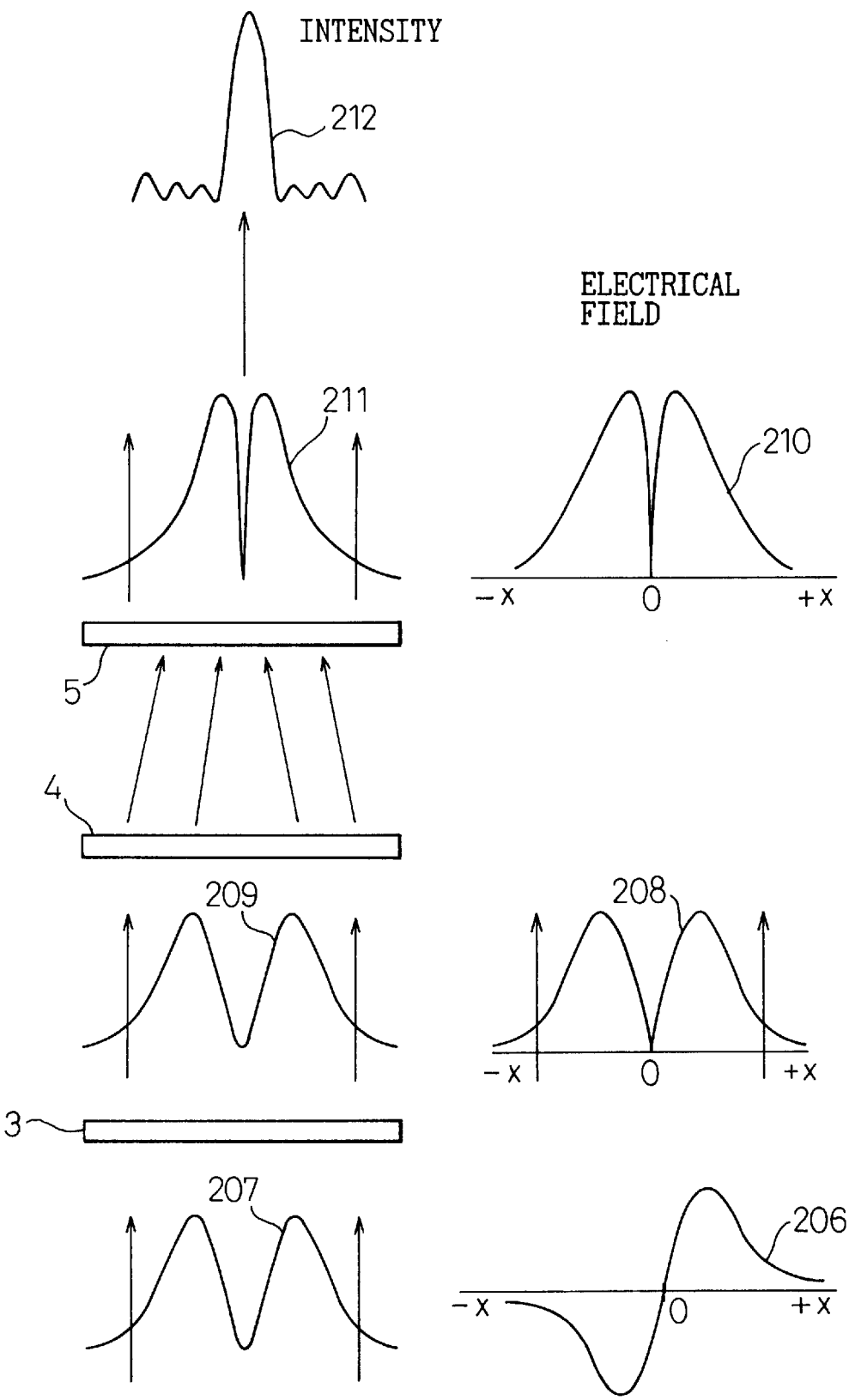
FIG. 9 is a view for explaining a phase conversion of the laser beam and an intensity distribution conversion thereof in the first embodiment.

FIG. 9 is a view for explaining effects of the phase adjusting plate 3 and the first and second binary optics elements. In the figure, the left-hand side shows a change in an intensity distribution of a laser beam; on the other hand, the right-hand side shows a electric amplitude distribution of the laser beam. The laser beam with a high-order transverse mode ($TEM_{10}$ mode) emitted from the laser resonator has a $\pi$ phase shift for each region of the laser beam divided in accordance with transverse modes. In the laser beam, the sign of the electric amplitude is reverse in the right and left regions, and gives plus and minus, respectively, as shown by a reference numeral 206. The intensity distribution is as shown by a reference numeral 207 because it corresponds to the square of electric amplitude distribution. The phase adjusting plate 3 achieves phase matching in each region of the laser beam with a high-order transverse mode, and converts the electric field of the laser beam into an electric field distribution as shown by a reference numeral 208.

Figure 10:
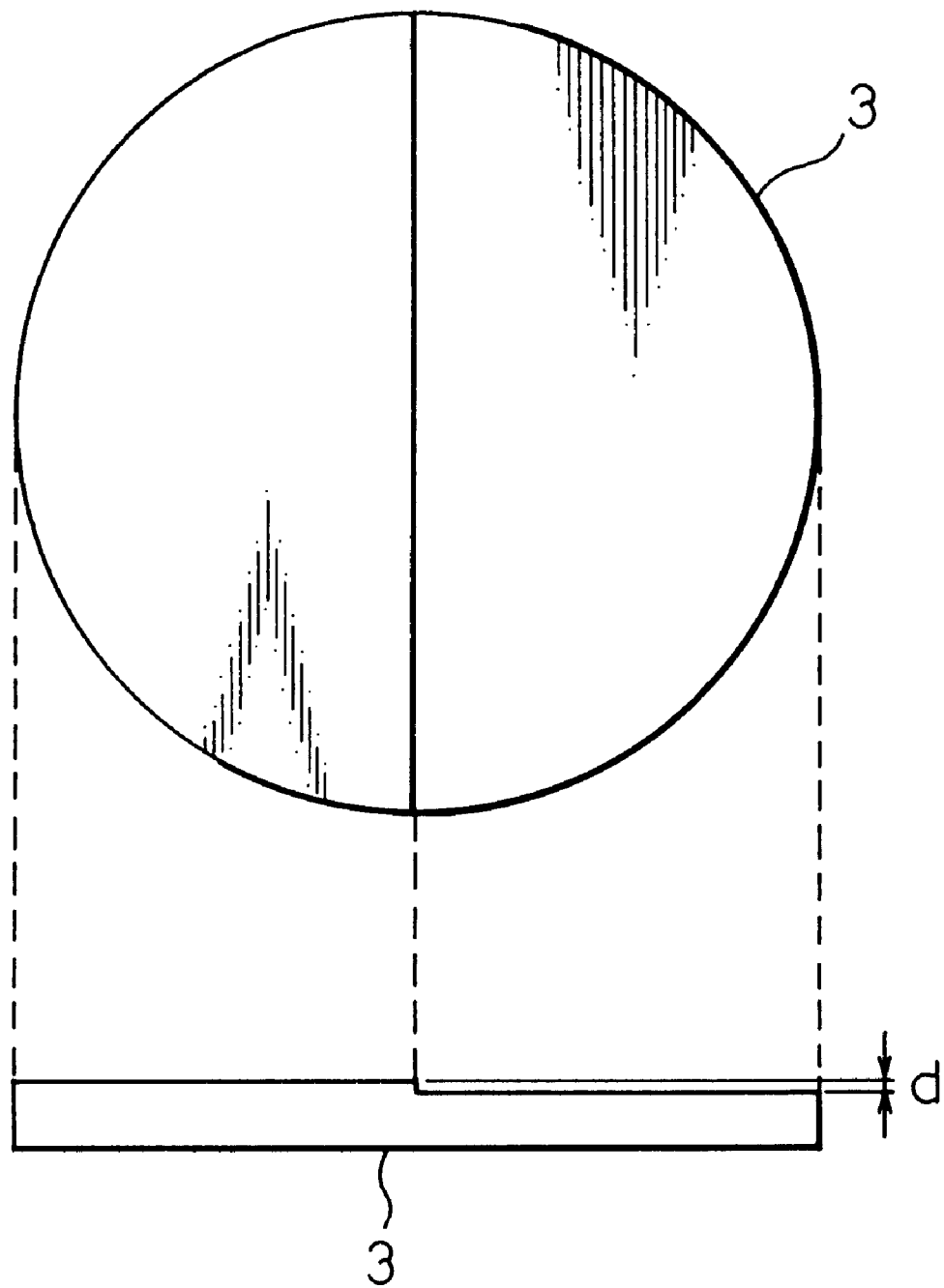
FIG. 10 is a view showing a phase adjusting plate according to the first embodiment.

FIG. 10 shows an example of the phase adjusting plate 3. As shown in the figure, the phase adjusting plate is a transparent glass flat plate with two regions divided into right and left. One of two regions has a thickness different from the other thereof by a thickness "d". The thickness "d" is set so that the difference of optical paths becomes a half wavelength, on the basis of a laser beam wavelength and a diffractive index of the glass plate. The phase adjusting plate, that is, a phase adjusting means 3 is made as a binary optics element, for example. In the $TEM_{11}$-mode laser beam, a disc-like plate is divided into four regions so that two regions on a diagonal line is coupled and a thickness is different for each couple.

Now referring to FIG. 9, the electric amplitude distribution of the laser beam is converted as shown by the reference numeral 208, so that the laser beams of adjacent regions are interactive. At this time, the intensity distribution of laser beam has a distribution as shown by a reference numeral 209. In such a state, the laser beam is divided into plural spots corresponding to the high-order transverse mode. Further, the intensity between two spots of the laser beam is low, and there is a large channel in its intensity distribution. In order to avoid such a disadvantage, the direction of the laser beam is partially changed by means of the first binary optics element 4, and further, with use of the second binary optics element 5, the laser beam is formed so as to have the electrical amplitude distribution as shown by 210 and the intensity distribution as shown by 211 which has a narrow-width channel. The second binary optics element 5 converts the laser beam incident upon each portion thereof into a parallel beam.

Figure 11A:
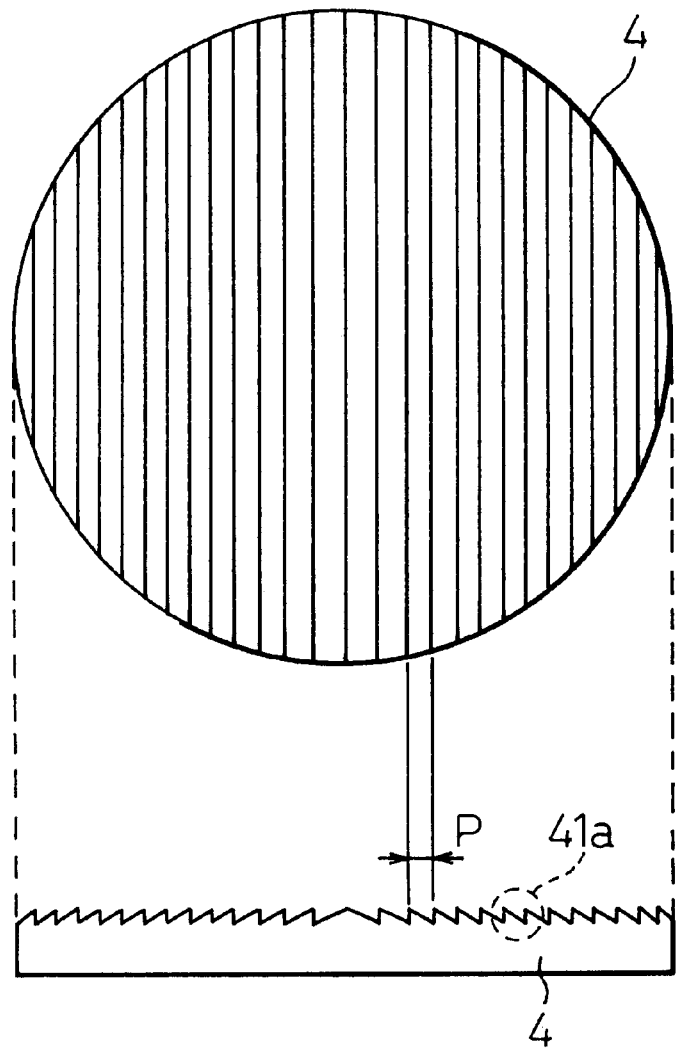
FIG. 11A and FIG. 11B are views showing an example of the first direction change binary optics element according to the first embodiment.
Figure 11B:

FIG. 11A and FIG. 11B are views showing the first binary optics element 4. The laser beam with a $TEM_{10}$ mode has a Gaussian profile in the plane perpendicular to the gratings. Thus, the Gaussian distribution is realized if the intensity profile is redistributed only in the plane parallel to the gratings. Therefore, a parallel diffraction grating as shown in FIG. 11A is used to change the traveling direction of rays of the laser beam in the plane perpendicular to the gratings. The distribution of the gratings, of the first binary optics element 4 has a symmetry in the plane perpendicular to the gratings. The first binary optics element 4 is arranged so that the center thereof coincides with the optical axis of a laser beam. The change in the traveling direction of one of the rays of the laser beam is determined by a pitch "p" of diffraction grating, and the pitch "p" varies gently. As shown in FIG. 11B, the diffraction grating has a micro step-like relief formed to have an envelope with a desired slope angle for each portion. This serves to obtain a very high diffraction efficiency of 95% or more.

Figure 12:
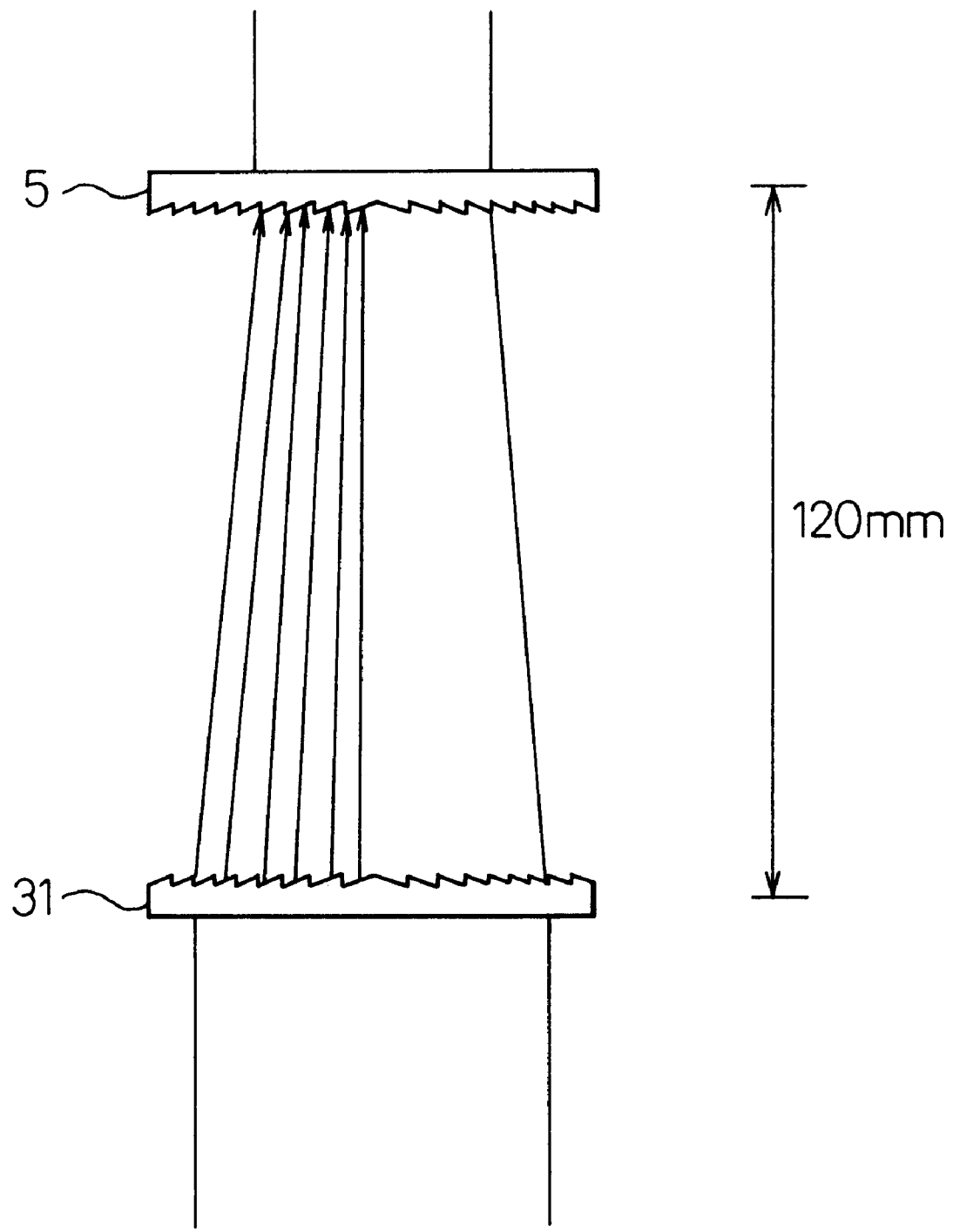
FIG. 12 is a view showing an example of the positional relationship between two binary optics elements according to the first embodiment.
Figure 13A:
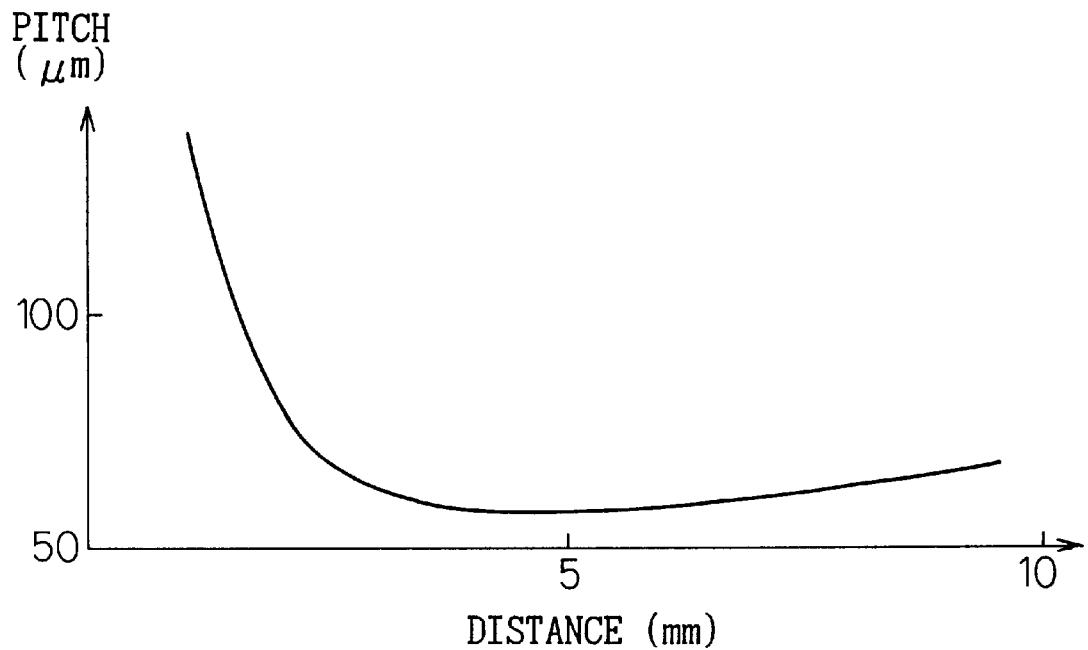
FIG. 13A and FIG. 13B are views showing a change in a diffraction grating pitch with respect to a distance from two binary optics elements according to the first embodiment.
Figure 13B:
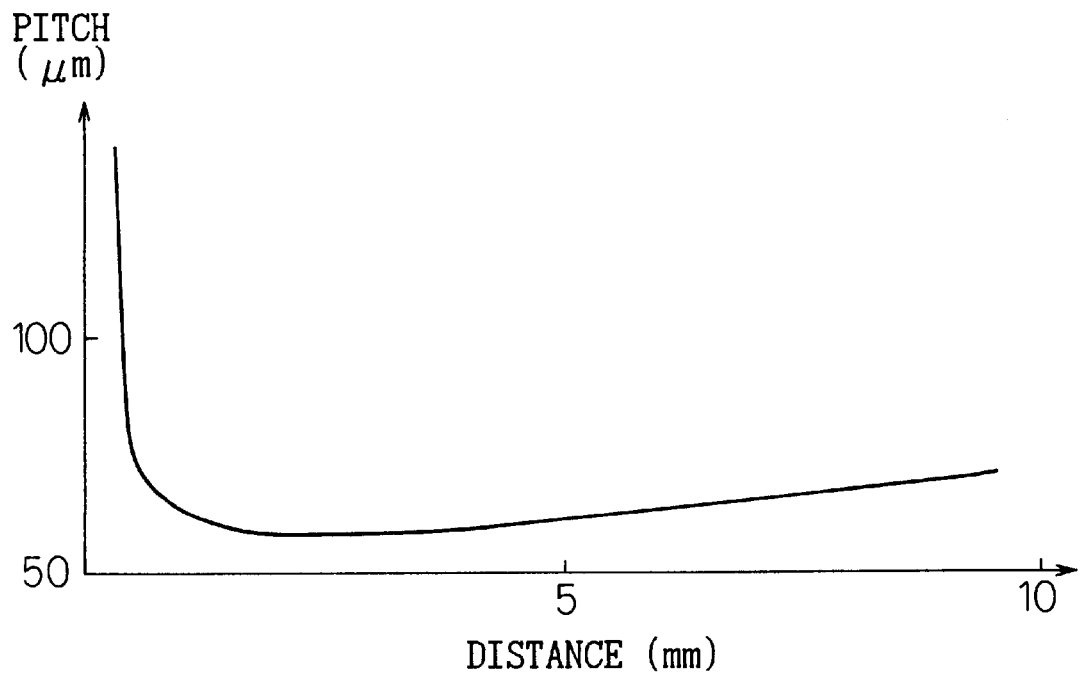

FIG. 12 is a view schematically showing a positional relationship between the first and the second binary optics elements 4 and 5 and a change in the direction of the laser beam. The beam diameter is 10 mm, and the first and the second binary optics elements 4 and 5 are arranged in a state that they are separated from each other with a distance of about 120 mm. FIG. 13A is a view showing a relationship between a position from the middle of the first binary optics element 4 and the pitch of the diffraction grating at the position. As seen from the figure, the pitch of the first binary optics element is infinite at the middle and decrease to the minimum 58.2 µm in the vicinity of 4 mm from the middle, and then gradually increase. Likewise, FIG. 13B is a view showing a relationship between a position from the middle of the second binary optics element 5 and the pitch of the diffraction grating at the position. As seen from the figure, the pitch of the second binary optics element varies as in the case of the first binary optics element 4 shown in FIG. 13A. Although the minimum pitch of the second binary optics element 5 is 58.2 µm which is the same as that of the first binary optics element, the position which gives the minimum pitch is the vicinity of 2 mm from the middle thereof. That is say, specifically, the direction of the ray incident upon the vicinity of 4 mm from the center of the first binary optics element 4 is changed at an angle of about 1° toward the optical axis, and then, the ray is incident upon the vicinity of 2 mm from the center of the second binary optics element 5 situated at the position 120 mm apart from the first binary optics element 4, thus being formed into a parallel beam.

In this case, the matter of importance is as follows. Specifically, although the traveling direction of a ray in the laser beam is changed for each portion thereof by means of the first binary optics element 4, the directions of the rays are changed so that all the rays of the laser beam incident upon the first binary optics element 4 do not intersect each other even if distances between rays is changed when the laser beam is incident upon the second binary optics element 5.

Referring again to FIG. 9, the laser beam passing through the second binary optics element 5 has the electrical field strength as shown by 210 and the light intensity distribution as shown by 211. As is evident from the figure, the width of the channel in the center of the laser beam becomes narrow. Subsequently, with reference to FIG. 14A to FIG. 14C, the following is an explanation about the propagation of the laser beam of an intensity distribution with a narrow-width channel in the middle of the beam. The intensity distribution with a narrow-width channel in the middle of the beam is caused when laser beam with a Gaussian distribution is passed through a linear screen. Thus, it is considered that the aforesaid intensity distribution is obtained by subtracting a laser beam which passed through a slit as shown in FIG. 14C from a laser beam of Gaussian distribution as shown in FIG. 14B. Therefore, regarding the propagation of a laser beam, the electric amplitude distribution is obtained by subtracting an electric amplitude distribution of the laser beam which passed through a slit as shown in FIG. 14C, from an electric amplitude distribution of the laser beam with Gaussian distribution as shown in FIG. 14B. Namely, the electric amplitude distribution $E(x_0)$ is obtained by the following formula:

$$E(x_0)=\exp(-x_0^2/w^2)-\int_{-D/2}^{D/2}\exp(-ik(x_0/R_0)x)dx$$

where w is the beam radius, i the imaginary unit, k the wave number, $R_0$ is the distance from the binary optics element 5. As shown in FIG. 14C, the laser beam which passed through a slit has a rapid divergence due to Fraunhofer diffraction accompanying the propagation.

Figure 15A:
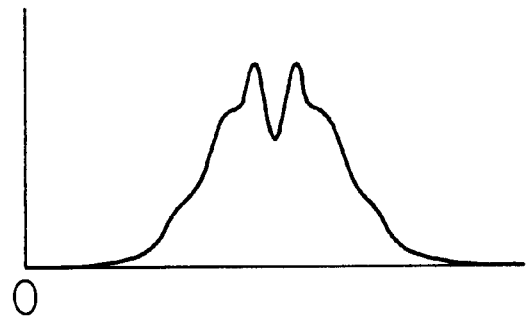
FIG. 15A to FIG. 15E are views showing simulation results of a change in an intensity distribution accompanying with a travel of a laser beam with a channel in the center of the intensity distribution.
Figure 15B:
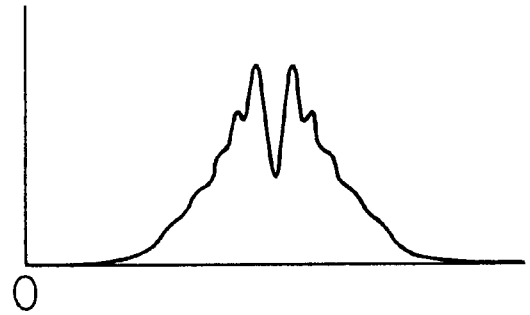
Figure 15C:
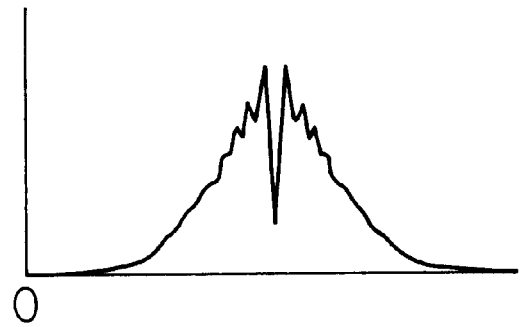
Figure 15D:
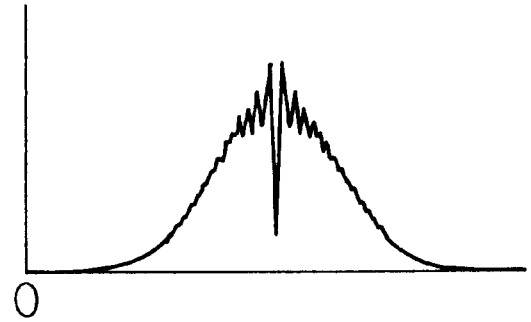
Figure 15E:
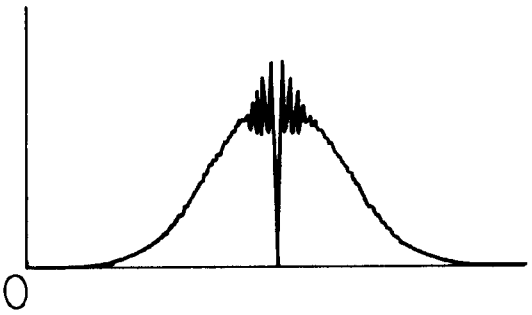
Figure 16A:
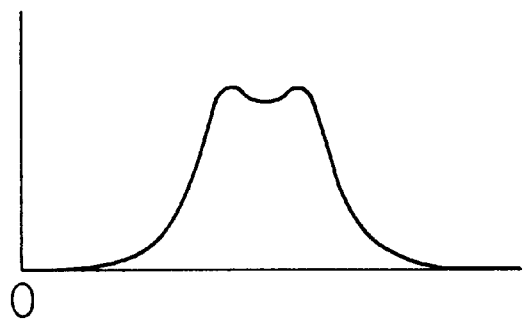
FIG. 16A to FIG. 16E are views showing simulation results of a change in an intensity distribution accompanying with a travel of a laser beam with a channel in the center of the intensity distribution, under another condition.
Figure 16B:
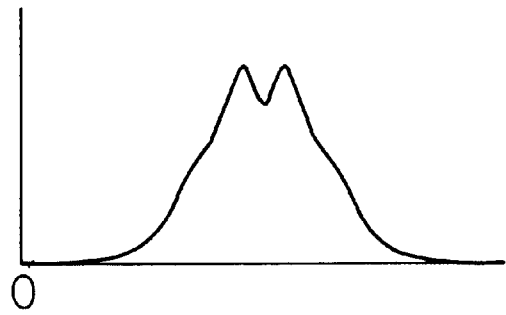
Figure 16C:
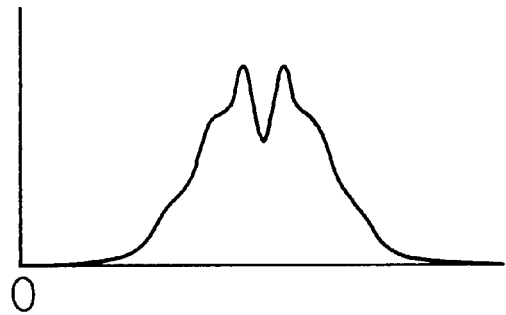
Figure 16D:
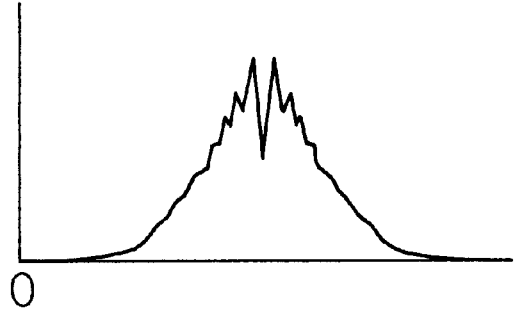
Figure 16E:
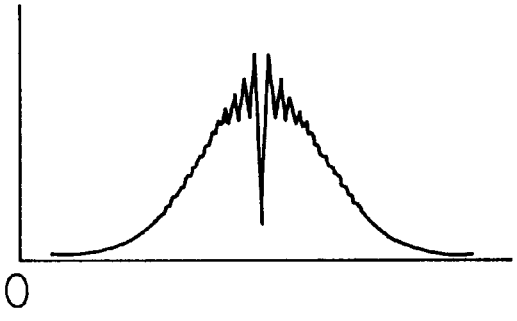
Figure 17A:
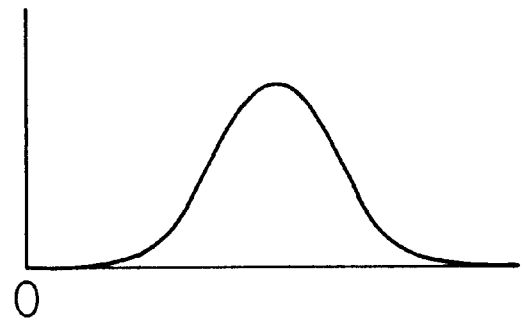
FIG. 17A to FIG. 17E are views showing simulation results of a change in an intensity distribution accompanying with a travel of a laser beam with a channel in the center of the intensity distribution, under another condition.
Figure 17B:
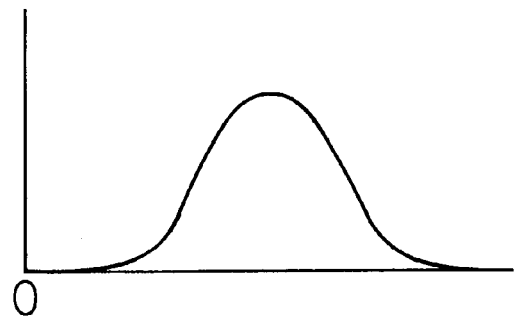
Figure 17C:
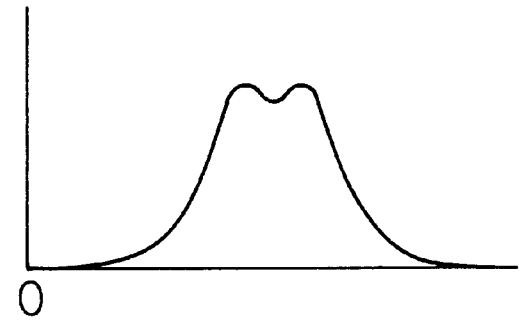
Figure 17D:
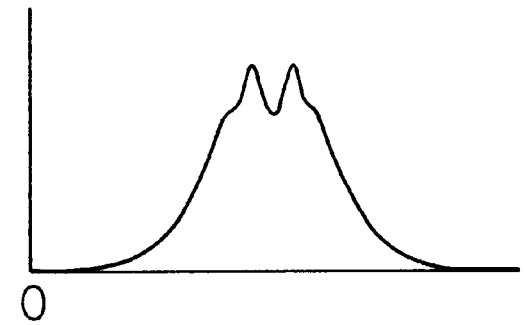
Figure 17E:
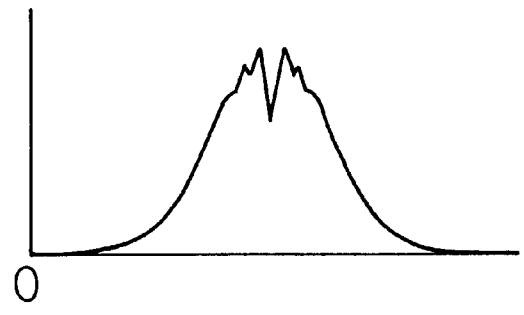
Figure 18A:
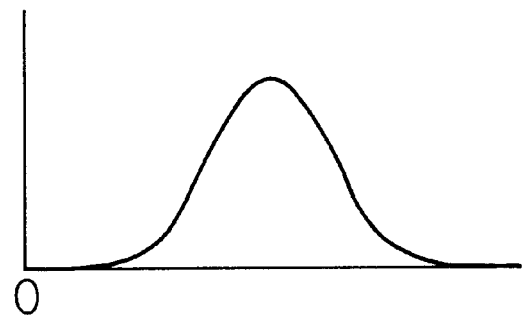
FIG. 18A to FIG. 18E are views showing simulation results of a change in an intensity distribution accompanying with a progress of a laser beam with a channel in the center of the intensity distribution, under another condition.
Figure 18B:
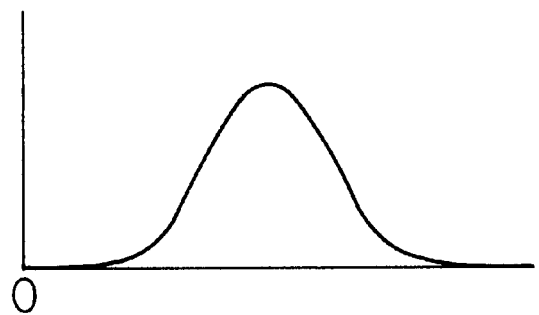
Figure 18C:
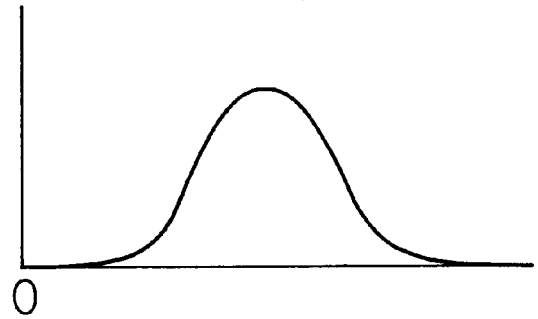
Figure 18D:
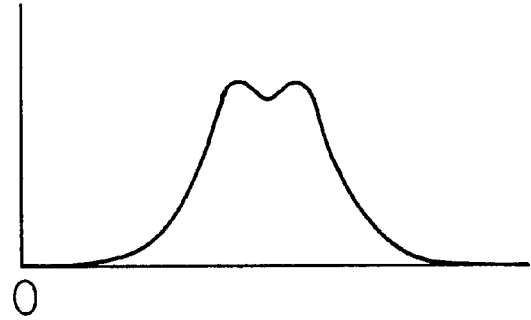
Figure 18E:
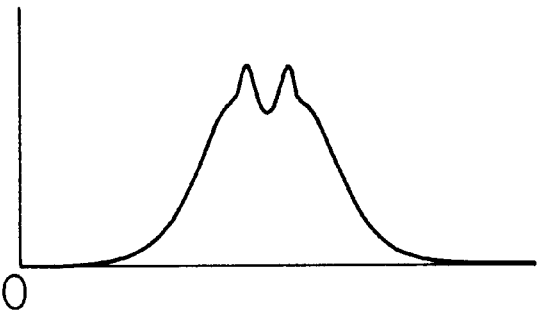
Figure 19A:
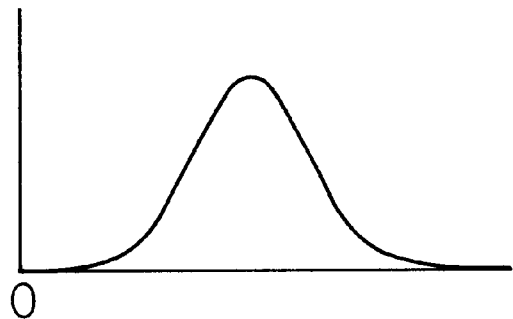
FIG. 19A to FIG. 19E are views showing simulation results of a change in an intensity distribution accompanying with a travel of a laser beam with a channel in the center of the intensity distribution, under another condition.
Figure 19B:
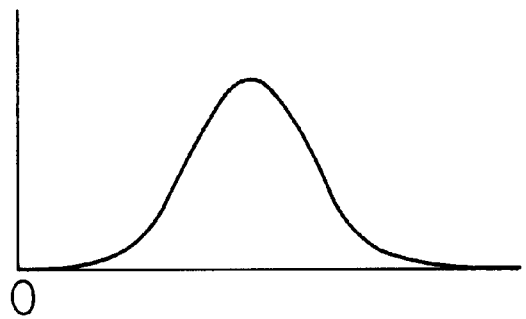
Figure 19C:
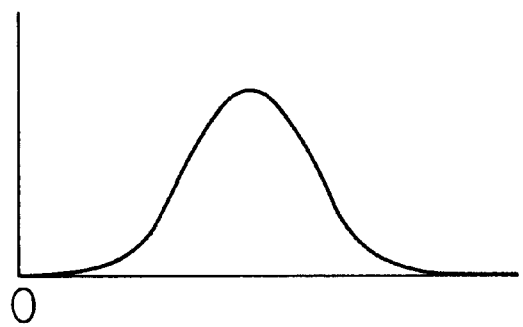
Figure 19D:
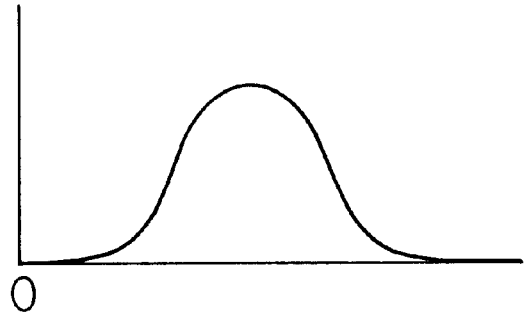
Figure 19E:
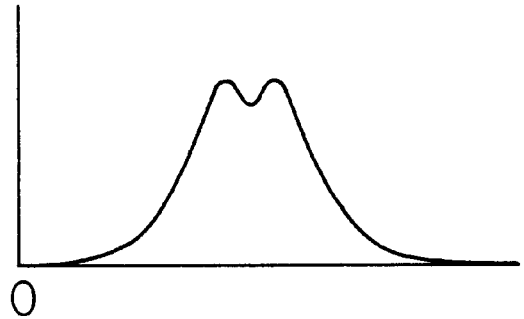

FIG. 15A to FIG. 15E are views showing simulation results of a change in a profile of a laser beam accompanying with the beam propagation in case that the beam diameter of the laser beam shown in FIG. 14A is 30 mm and a channel width D in the middle is 200 µm. FIG. 15A shows the calculated beam profile at a position 500 mm from the linear screen; FIG. 15B shows the calculated beam profile at a position 300 mm from the laser screen; FIG. 15C shows the calculated beam profile at a position 200 mm from the linear screen; FIG. 15D shows the calculated beam profile at a position 100 mm from the linear screen; and FIG. 15E shows the calculated beam profile at a position 50 mm from the linear screen.

Likewise, FIG. 16A to FIG. 16E are views showing simulation results of a change in a beam profile of a laser beam accompanying with the beam propagation in case that the channel width D in the middle is 100 µm, and that other conditions are the same as those in FIG. 15A to FIG. 15E.

Likewise, FIG. 17A to FIG. 17E are views showing simulation results of a change in a profile of a laser beam accompanying the beam propagation in case that the channel width D in the middle is 50 µm, and that other conditions are the same as those in FIG. 15A to FIG. 15E.

Likewise, FIG. 18A to FIG. 18E are views showing simulation results of a change in a profile of a laser beam accompanying the beam propagation in case that the channel width D of the middle thereof is 30 µm, and that other conditions are the same as those in FIG. 15A to FIG. 15E.

Likewise, FIG. 19A to FIG. 19E are views showing simulation results of a change in a profile of a laser beam accompanying the beam propagation in case that the width D of the channel in the middle is 20 μm, and that other conditions are the same as those FIG. 15A to FIG. 15E.

As described above, the channel width gradually becomes small as the traveling distance of the laser beam becomes large. In particular, in case that the channel width D is less than 30 μm to 50 μm, it can be seen that the laser beam has a beam profile of substantially Gaussian distribution at a position over ≈100 mm from the linear screen.

Referring again to FIG. 9, the aforesaid Fraunhofer diffraction component is not converted into a parallel beam by means of the second binary optics element 5. For this reason, as shown by a reference numeral 212, in a far field, a components with worse quality appear at the wings separated from the middle. Such a diffraction component is not preferable to the laser processing machine; for this reason, it is removed by means of a beam-quality modifying apparatus comprising the first and the second lenses 61 and 63 and an aperture member 62 with a pinhole 62a.

Figure 20:
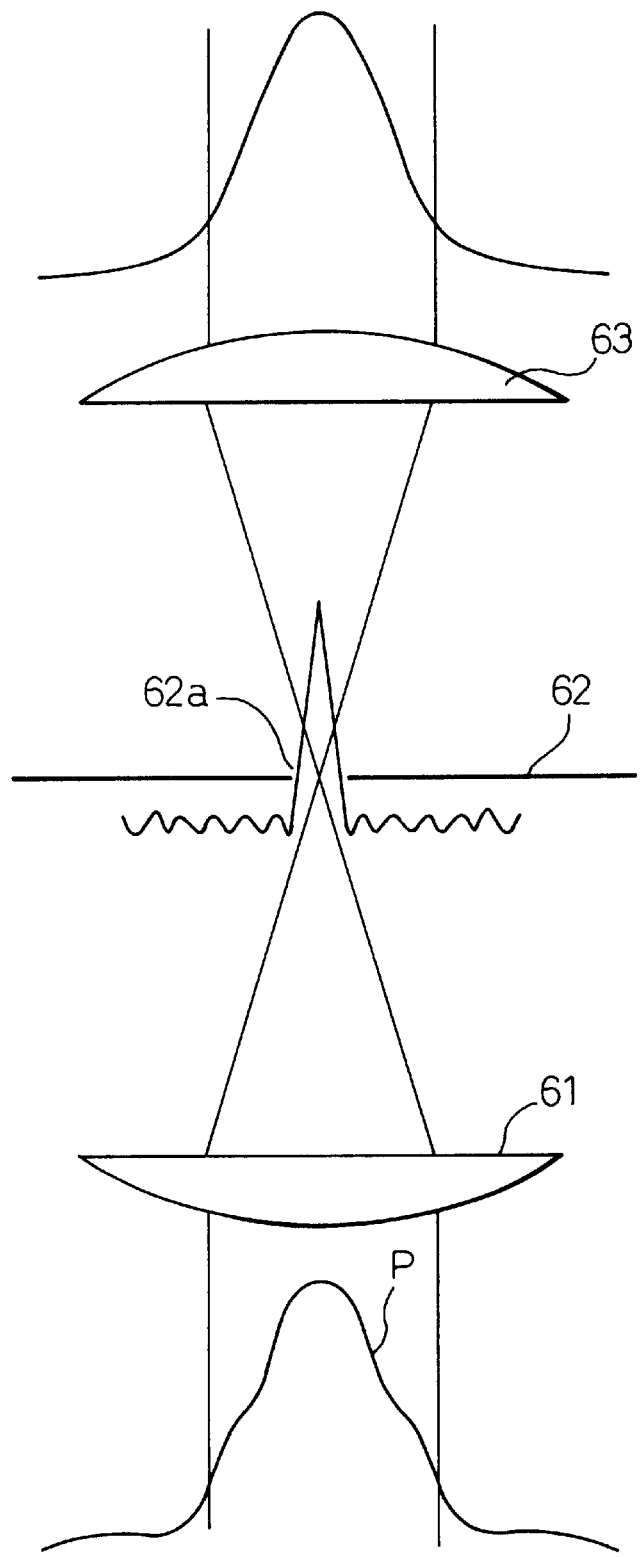
FIG. 20 is a view showing a construction in which a pinhole is arranged on the converged position of a laser beam to remove a noise component in the first embodiment.

FIG. 20 is a view schematically showing principle parts of the beam quality modifying apparatus. As shown in the figure, the laser beam existing from the second binary optics element 5 is converged by means of the spherical lens 61, and the aperture member 62 is arranged so that the pinhole thereof is situated on the laser beam converged position. By doing this, diffraction component spreaded in both wings is not passed through an aperture 62a; therefore, the diffraction component can be removed. Thus, only the rays of the laser beam passing through the aperture 62a is converted into a parallel beam by means of the spherical lens 63, so that a laser beam of Gaussian distribution can be obtained. Also, these spherical lenses 61 and 63 may be realized with use of binary optics elements.

FIG. 21 is a view showing a construction of a laser light source and a laser beam converter according to a second embodiment of the present invention. The second embodiment differs from the first embodiment in that the phase adjusting plate 3 and the first binary optics element 4 are integrated together and function as a phase-adjustment/direction-change binary optics element (hereinafter, referred simply to as a phase/direction binary optics element) 31.

Figure 22A:
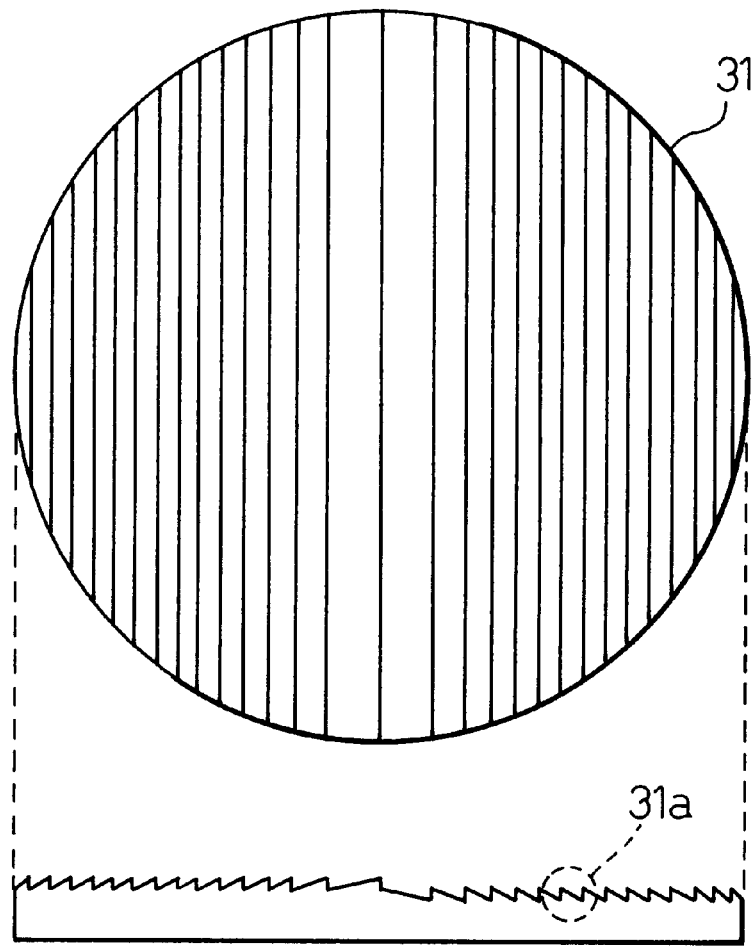
FIG. 22A and FIG. 22B are views showing a phase-adjusting/direction-change binary optics element according to the second embodiment.
Figure 22B:
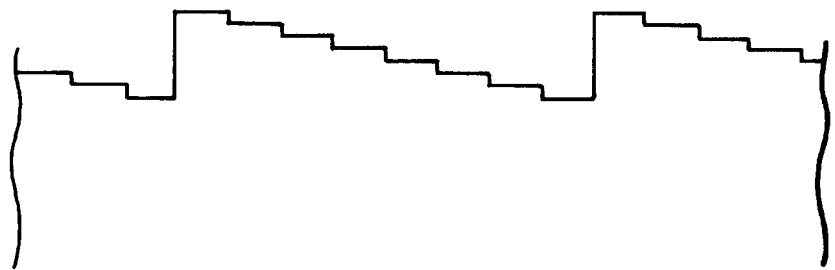

FIG. 22A and FIG. 22B are views showing the phase/direction binary optics element 31. As shown in the figure, there are different steps formed on the surface of the right and left region of a diffraction grating. These different steps serve to match a phase while changing a direction of a ray incident thereupon. The diffraction grating is the same as that used in the first embodiment except that surface levels of the left and right regions are shifted by d. Also, the diffraction grating on one face is formed with the same steps as that of the first embodiment, and the other face thereof may be formed with a step by a between the right and left regions.

FIG. 23 is a view showing a construction of a laser light source and a laser beam converter according to a third embodiment of the present invention. The third embodiment differs from the second embodiment in that a laser beam passing through the second binary optics element 5 is converged by means of a sphere lens 71 and is guided into an optical fiber 9.

Figure 24:
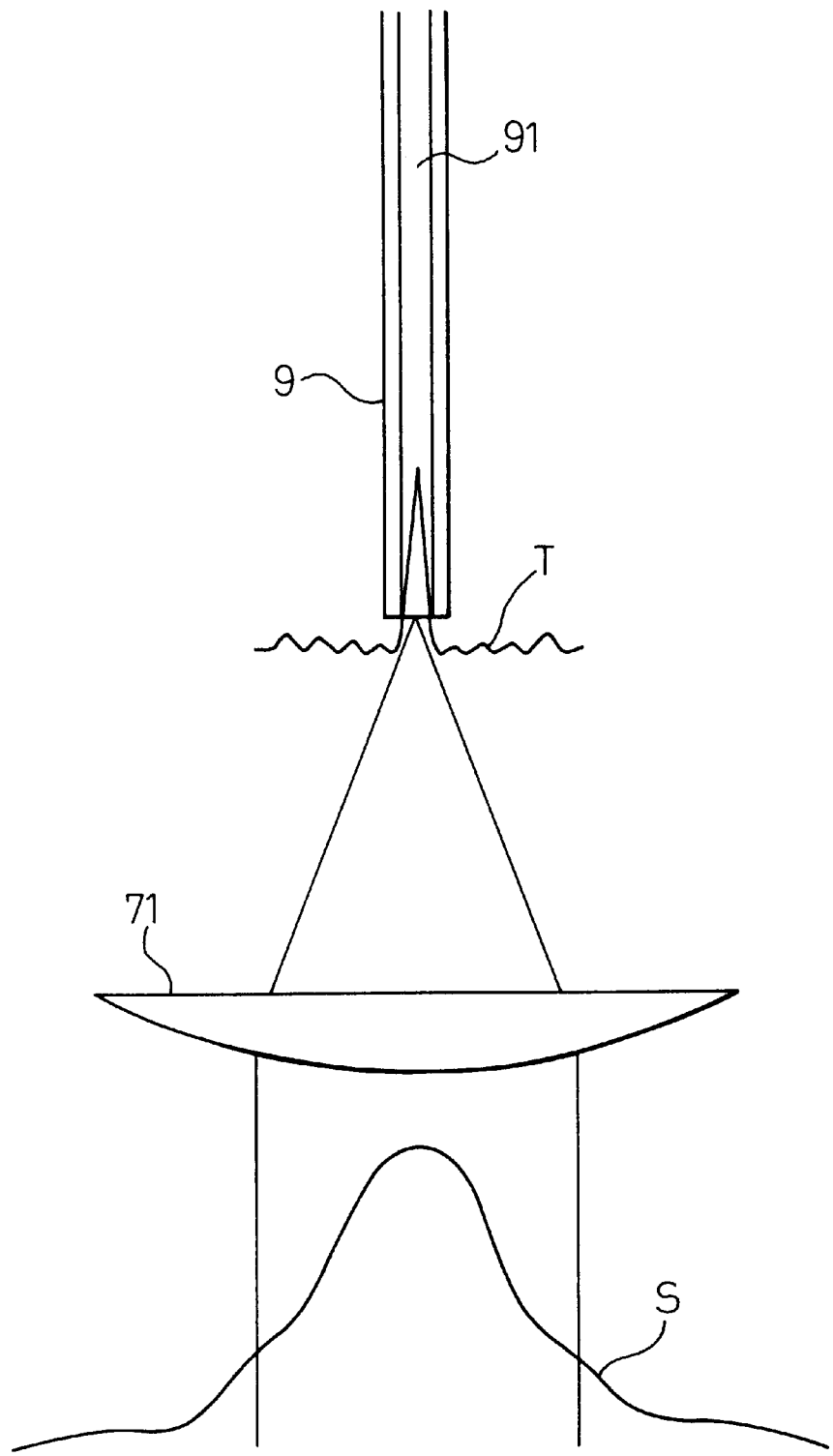
FIG. 24 is a view showing a state that a laser beam is converged upon a core end face of an optical fiber in the third embodiment of the present invention.

FIG. 24 is a view showing a state that the laser beam is converged by means of the sphere lens 71 and is guided into the optical fiber 9. In this case, a core 91 of the optical fiber 9 exhibits the same effect as the aforesaid aperture 62a. When the laser beam is converged by the sphere lens 71, diffraction components are dispersed in out of the core 91; and, these components are removed without being guided into the core 91.

FIG. 25 is a view showing a construction of a laser light source and a laser beam converter according to a fourth embodiment of the present invention. The fourth embodiment differs from the second embodiment in that the laser resonator 1 emits a $TEM_{11}$ mode laser beam. The phase/direction change binary optics element 31 and a direction change plate 5 are constructed so that the $TEM_{11}$-mode laser beam can be converted into a laser beam with a substantially Gaussian distribution. Thus, the laser resonator 1 is provided with the transverse mode regulating plate as shown in FIG. 7A.

Figure 26A:
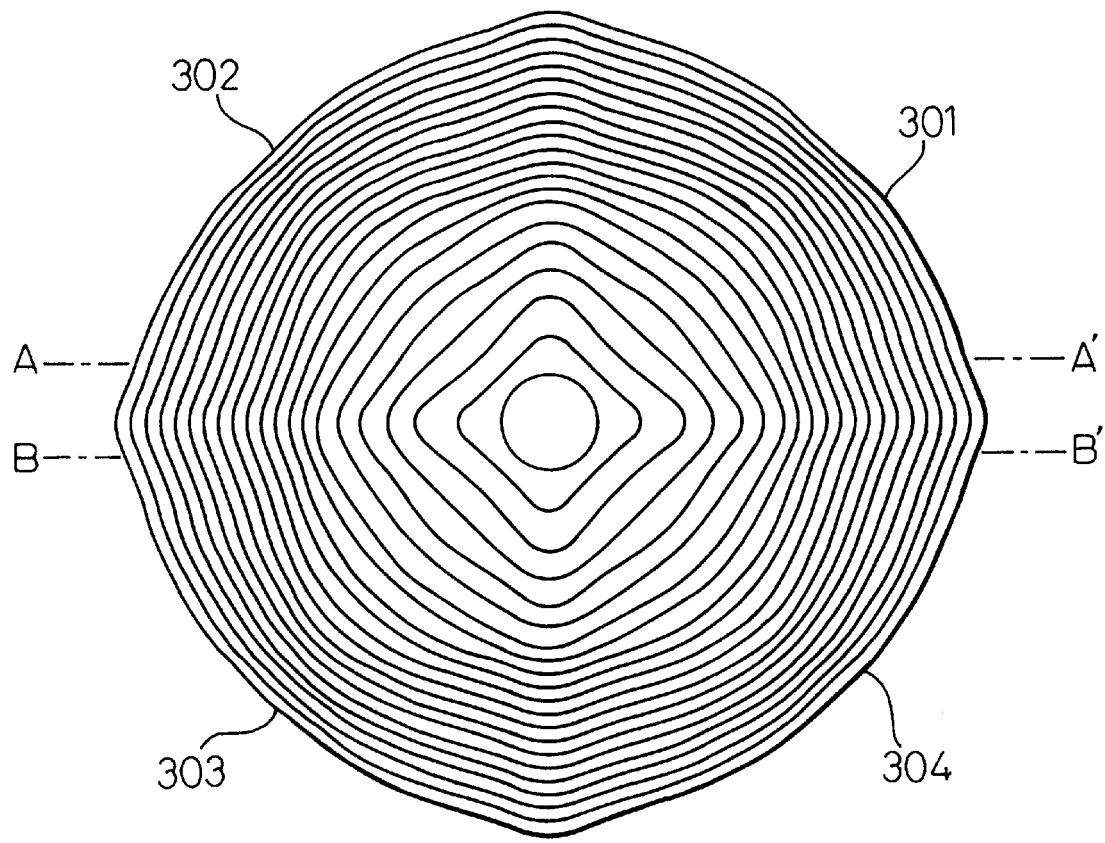
FIGS. 26A to 26C are views showing a phase-adjusting/direction-change binary optics element according to the fourth embodiment.
Figure 26B:
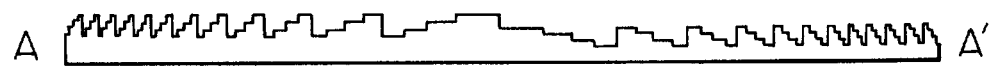
Figure 26C:
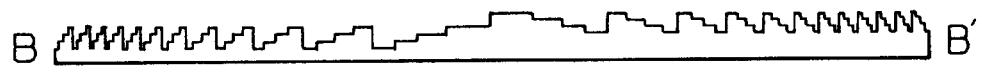

FIGS. 26A to 26C are views showing a pattern of a diffraction grating which is the phase/direction binary optics element 31 according to the fourth embodiment, and cross sections thereof. As shown in the figures, the phase/direction binary optics element 31 is divided into four regions 301 to 304. Regions 301 and 303 has a surface height lower than regions 302 and 304. This is determined on the basis of the following matters. Regions 301 and 303 has a thickness thinner than regions 302 and 304, and the difference in thickness between these regions serves to shift a phase of incident laser beam by π. Also, the pattern of diffraction grating is set so that the $TEM_{11}$ mode laser beam is formed into a beam profile with substantially Gaussian distribution.

The embodiments of the present invention has been described above. The present invention is applicable to other transverse modes. Also, in the embodiments, the first and the second binary optics elements and the phase/direction binary optics element are transmission type elements. These elements may be a reflection type elements. If these elements are reflection type elements, it is possible to shorten a length in the optical axis direction. Moreover, the present invention has explained with regard to an example of converting a laser beam with a high-order transverse mode into a laser beam with Gaussian distribution. It is possible to convert the laser beam into a laser beam with a desired beam profile other than Gaussian distribution by changing the diffraction grating pattern of the first and the second direction change plates and the phase-adjusting/direction-change plate.

As can be seen from the above explanation, according to the present invention, the laser beam with a high-order transverse mode with a poor beam quality can be converted into a laser beam which has a high beam quality and a desired beam profile. Therefore, it is possible to employ a laser beam with a high-order transverse mode which has thus far been difficult to use. In this way, the laser resonator stably produces a high-power laser beam in a specified high-order transverse mode, and the laser beam is converted into a laser beam with high beam quality. Accordingly, a high-power laser beam with high beam quality can be obtained.

What is claimed is:

1. A laser beam converter for converting a laser beam with a single high-order transverse mode into a laser beam with a predetermined distribution, comprising:

phase adjusting means for inverting a phase for each region divided depending upon a transverse mode of the laser beam so as to match the phase of each region of the laser beam;

first direction change means for changing a traveling direction of a ray of the laser beam with the phase matched by the phase adjusting means, for each position of the ray; and second direction change means for changing the traveling direction of a ray of the laser beam exiting from the first direction change means for each position thereof so as to form a parallel laser beam, the first direction change means changing a direction of the laser beam for each position thereof so that the laser beam becomes a predetermined intensity distribution at the second direction change means.

2. The laser beam converter according to claim 1, wherein the phase adjusting means and the first direction change means are integrated together, and are formed as an phase-adjusting/direction-change element.

3. The laser beam converter according to claim 1, wherein the phase adjusting means is a diffractive optical element.

4. The laser beam converter according to claim 3, wherein the phase adjusting means is a binary optics element.

5. The laser beam converter according to claim 1, wherein the first and the second direction change means are each a diffractive optical element.

6. The laser beam converter according to claim 5, wherein the first and the second direction change means are each a binary optics element.

7. The laser beam converter according to claim 2, wherein the phase-adjusting/direction-change element is a diffractive optical element.

8. The laser beam converter according to claim 7, wherein the phase-adjusting/direction-change element is a binary optics element.

9. The laser beam converter according to claim 2, wherein the second direction change means is a diffractive optical element.

10. The laser beam converter according to claim 9, wherein the second direction change means is a binary optics element.

11. The laser beam converter according to claim 1, wherein the laser beam converter further includes a first optical element for converging the laser beam exiting from the second direction change means, and a pinhole having a specified shape located on the laser beam converged position.

12. The laser beam converter according to claim 11, wherein the laser beam converter further includes a second optical element for converting the laser beam passing through the pinhole into a parallel laser beam.

13. The laser beam converter according to claim 1, wherein the laser beam converter includes an optical element for converging the laser beam exiting from the second direction change means onto a core end face of an optical fiber.

14. A laser beam converter for converting a laser beam with a single high-order transverse mode into a laser beam with an intensity of Gaussian distribution, comprising:

phase adjusting means for inverting a phase for each region divided depending upon a transverse mode of the laser beam so as to match the phase for each region;

a first optical element for converging the laser beam outputted from the phase adjusting means;

a pinhole with a specified shape located at the laser-beam converged position; and a second optical element for converting the laser beam passing through the pinhole into a parallel laser beam.

15. An optical system for guiding a laser beam with a single high-order transverse mode onto an optical fiber, comprising:

phase adjusting means for inverting a phase for each region of the laser beam with a single high-order transverse mode divided depending upon a transverse mode of the laser beam so as to match the phase for each region of the laser beam with a single high-order transverse mode; and an optical element for converging the laser beam exiting from the second a direction change means onto a core end face of an optical fiber.

* * * * *